(12) United States Patent
Tsai

(10) Patent No.: US 12,258,123 B2
(45) Date of Patent: Mar. 25, 2025

(54) FLAPERON ACTUATION SYSTEMS FOR AIRCRAFT

(71) Applicant: The Boeing Company, Chicago, IL (US)

(72) Inventor: Kevin Raylin Tsai, Seattle, WA (US)

(73) Assignee: The Boeing Company, Arlington, VA (US)

( * ) Notice: Subject to any disclaimer, the term of this patent is extended or adjusted under 35 U.S.C. 154(b) by 227 days.

(21) Appl. No.: 17/829,249

(22) Filed: May 31, 2022

(65) Prior Publication Data

US 2023/0382515 A1 Nov. 30, 2023

(51) Int. Cl.
*B64C 9/04* (2006.01)
*B64C 9/06* (2006.01)
*B64C 13/28* (2006.01)

(52) U.S. Cl.
CPC .................. *B64C 9/04* (2013.01); *B64C 9/06* (2013.01); *B64C 13/28* (2013.01)

(58) Field of Classification Search
CPC ................ B64C 9/00; B64C 9/04; B64C 9/06
See application file for complete search history.

(56) References Cited

U.S. PATENT DOCUMENTS 8,511,608 B1 * 8/2013 Good .................. B64C 9/16
244/99.3

FOREIGN PATENT DOCUMENTS

CA 3047296 A1 * 12/2019

* cited by examiner

*Primary Examiner* — Justin M Benedik
(74) *Attorney, Agent, or Firm* — HANLEY, FLIGHT & ZIMMERMAN, LLC

(57) ABSTRACT

Flaperon actuation systems for aircraft are disclosed herein. An example aircraft includes a wing including, a fixed wing portion, a flaperon, and an actuation system. The actuation system includes a first actuator coupled to the fixed wing portion. The first actuator is operable to move the flaperon along a first degree of freedom between a stowed position in which the flaperon is aligned with the fixed wing portion and a deployed position in which the flaperon is moved downward relative to the fixed wing portion. The actuation system also includes a linkage assembly coupled between the fixed wing portion and the flaperon. The linkage assembly includes a second actuator operable to move the flaperon along a second degree of freedom to pitch the flaperon between an upward position and a downward position.

19 Claims, 14 Drawing Sheets

FLAPERON ACTUATION SYSTEMS FOR AIRCRAFT

FIELD OF THE DISCLOSURE

This disclosure relates generally to aircraft and, more particularly, to flaperon actuation systems for aircraft.

BACKGROUND

Many aircraft employ high lift devices, sometimes referred to as auxiliary airfoils or movable control surfaces, along the leading and trailing edges of the wings. For example, flaps and flaperons are a common type of high lift device that are movably coupled along the trailing edge of a wing. The flaps and flaperons can be moved (e.g., tilted) downward from the trailing edge of the wing to change the shape of the wing to create more lift. The flaps and flaperons are often deployed during takeoff and landing, for instance, to generate greater lift at slower speeds.

SUMMARY

An example aircraft disclosed herein includes a wing including a fixed wing portion, a flaperon, and an actuation system including a first actuator coupled to the fixed wing portion. The first actuator is operable to move the flaperon along a first degree of freedom between a stowed position in which the flaperon is aligned with the fixed wing portion and a deployed position in which the flaperon is moved downward relative to the fixed wing portion. The actuation system also includes a linkage assembly coupled between the fixed wing portion and the flaperon. The linkage assembly includes a second actuator operable to move the flaperon along a second degree of freedom to pitch the flaperon between an upward position and a downward position.

Another example aircraft disclosed herein includes a wing including a fixed wing portion, a flaperon, and an actuation system including a first actuator coupled to the fixed wing portion, a rocker rotatably coupled to the fixed wing portion, the flaperon rotatably coupled to the rocker, a push rod coupled between the first actuator and the rocker such that activation of the first actuator moves the rocker and the flaperon, and a second actuator coupled between the rocker and the flaperon such that activation of the second actuator moves the flaperon relative to the rocker.

An example method disclosed herein includes activating a first actuator to move a flaperon of an aircraft wing along a first degree of freedom between a stowed position and a deployed position relative to a fixed wing portion of the aircraft wing, and activating a second actuator to move the flaperon along a second degree of freedom to pitch the flaperon between an upward position and a downward position.

BRIEF DESCRIPTION OF THE DRAWINGS

FIGS. 8A-8D show the example flaperon in various positions.

FIGS. 9A-9D show the example flaperon in the same positions as FIGS. 8A-8D.

The figures are not to scale. In general, the same reference numbers will be used throughout the drawing(s) and accompanying written description to refer to the same or like parts.

Figure 1:
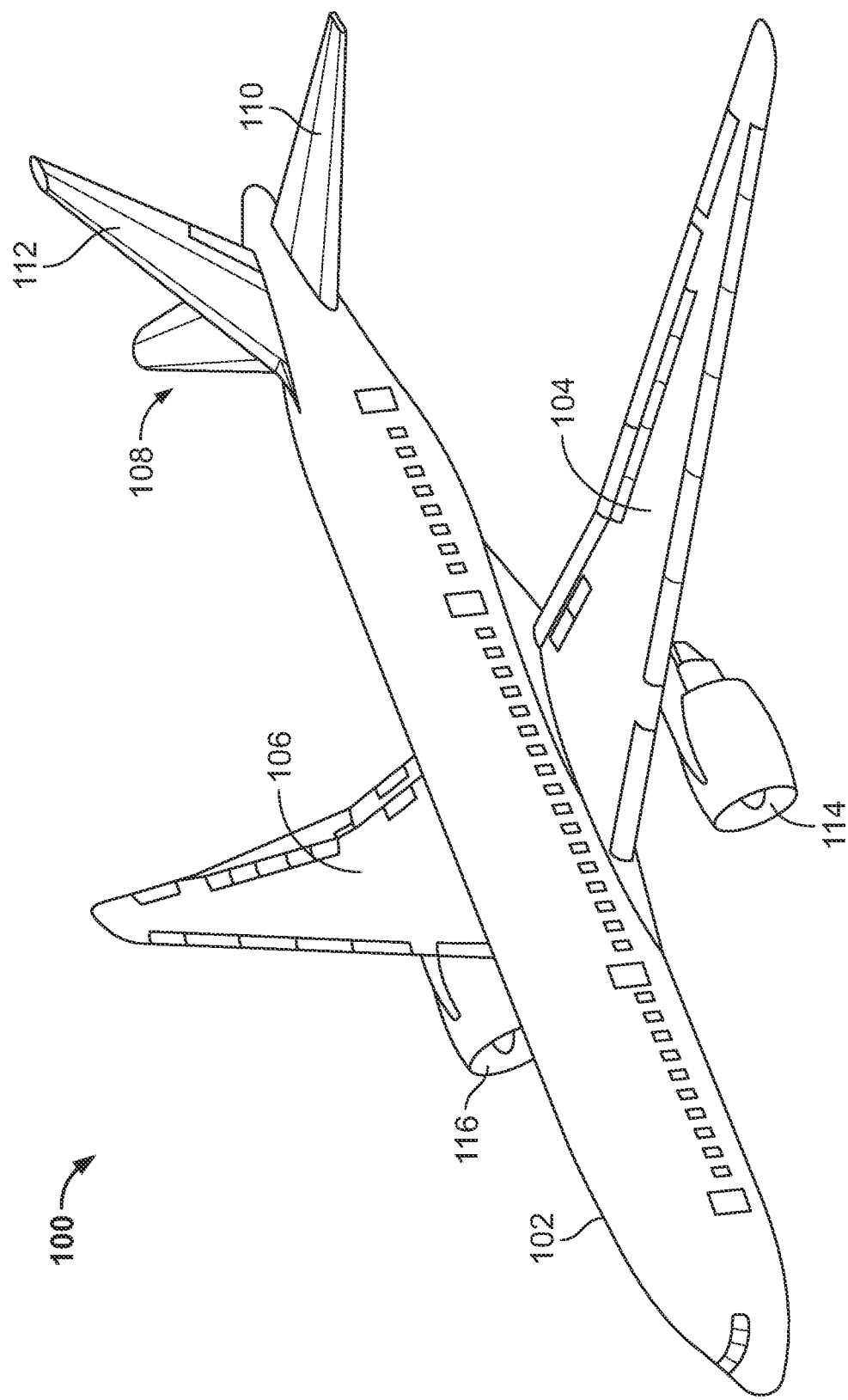
FIG. 1 illustrates an example aircraft in which the example actuation systems disclosed herein can be implemented.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Many aircraft employ one or more high-lift devices along the leading and/or trailing edges of the wings. Flaps are a common type of high-lift device that are movably mounted along a trailing edge of a wing. A flap, for instance, is movable between a stowed position in which the flap is aligned with the wing and a deployed position in which the flap is moved (and/or angled) downward from the trailing edge of the wing. Aircraft can include one or multiple flaps along the trailing edge of a wing. When deployed, the flap(s) change(s) the effective chord length and camber of the wing, which can be used to generate more lift and drag. As such, flaps are typically deployed during takeoff and landing. Flaperons are another type of high-lift device that are moveably mounted along a trailing edge of a wing in addition to the one or more flaps. Flaperons have similar movement as the flaps and can be deployed during take-off and landing to generate lift. Flaperons can also be moved separately from the flaps to assist in roll control.

Disclosed herein are example actuation systems for moving a flap or flaperon relative to a trailing edge of a wing. Many of the example actuation systems disclosed herein are described in connection with a flaperon. However, it is understood that any of the example actuation systems can also be implemented in connection with a flap (which may not have efficient aileron capabilities). An example flaperon actuation system disclosed herein includes a first actuator that can be activated to move the flaperon along a first degree of freedom and a second actuator that can move the flaperon along a second degree of freedom. The first actuator can be activated, for example, to move the flaperon between a stowed position in which the flaperon is aligned with a fixed wing portion of the wing and a deployed position in which the flaperon is moved downward relative to the fixed wing portion of the wing. The flaperon generates more lift in the deployed position, so the first actuator is typically activated to move the flaperon to the deployed position during take-off or landing. Further, the second actuator can be activated, independently of the first actuator, to pitch the flaperon upward or downward. This can be used to increase or decrease the amount of lift and, thus, provide more lift control. Further, in some examples, this additional degree of freedom enables the flaperon to be moved to a deeper, deployed position, sometimes referred to as high camber configuration. This effectively increases the deflection and camber of the wing and, thus, can achieve greater lift. In some examples, a drooping spoiler is disposed forward or upstream of the flaperon. The deployed flaperon and the drooping spoiler combine to create a powerful mechanism for generating high lift. The example second actuator can also be used to slightly reduce the lift and drag, which may be beneficial for reducing noise during landing and/or alleviating load. Further, the second actuator may be a smaller, quicker actuator than the first actuator. Therefore, the second actuator can be activated more quickly move the flaperon to adjust and optimize lift and drag. This is beneficial during take-off, landing, and cruise.

Also, in some examples, the second actuator can be used to provide roll control, similar to an aileron. For example, while the flaperon is in the stowed position, the second actuator can be activated to pitch the flaperon upward or downward relative to the trailing edge of the wing. In this manner, the flaperon can be used to roll the aircraft. As such, in some examples, the ailerons can be completely eliminated from the wing. This reduces (e.g., minimizes) the number of actuation systems on the wing (e.g., because of no aileron systems) and may thus enable simpler outboard wing structures. This may also enable thinner loft wings. Thus, because the flaperon can operate as a multi-functional device (e.g., both a flap and an aileron), the example flaperon actuation systems may also reduce cost and weight.

FIG. 1 illustrates an example aircraft 100 in which the examples disclosed herein can be implemented. In the illustrated example, the aircraft 100 includes a fuselage 102, a first wing 104 (a left wing) coupled to the fuselage 102, a second wing 106 (a right wing) coupled to the fuselage 102, and an empennage 108 at an aft end of the fuselage 102. The empennage 108 has a horizontal stabilizer 110 and a vertical stabilizer 112. The aircraft 100 also includes a first engine 114 carried by the first wing 104 and a second engine 116 carried by the second wing 106. In other examples, the aircraft 100 may have multiple engines coupled to each of the first and second wings 104, 106 and/or disposed in other locations on the aircraft 100 (e.g., coupled to the fuselage 102, coupled to the empennage 108, etc.).

The first and second wings 104, 106, the horizontal stabilizer 110, and/or the vertical stabilizer 112 may have one or more control surfaces, such as high lift devices, that are located along the leading and/or trailing edges of the respective components. Such control surfaces can be moved relative to the leading and/or trailing edges of the components to affect the lift and/or attitude (e.g., roll, pitch, and yaw) of the aircraft 100. Disclosed herein are example actuation systems that are configured to move a flap or a flaperon, which are high lift surfaces along the trailing edges of the first and second wings 104, 106. However, the example actuation systems can be similarly utilized in connection with other control surfaces, such as an aileron, a rudder, an elevator, etc.

Figure 2A:
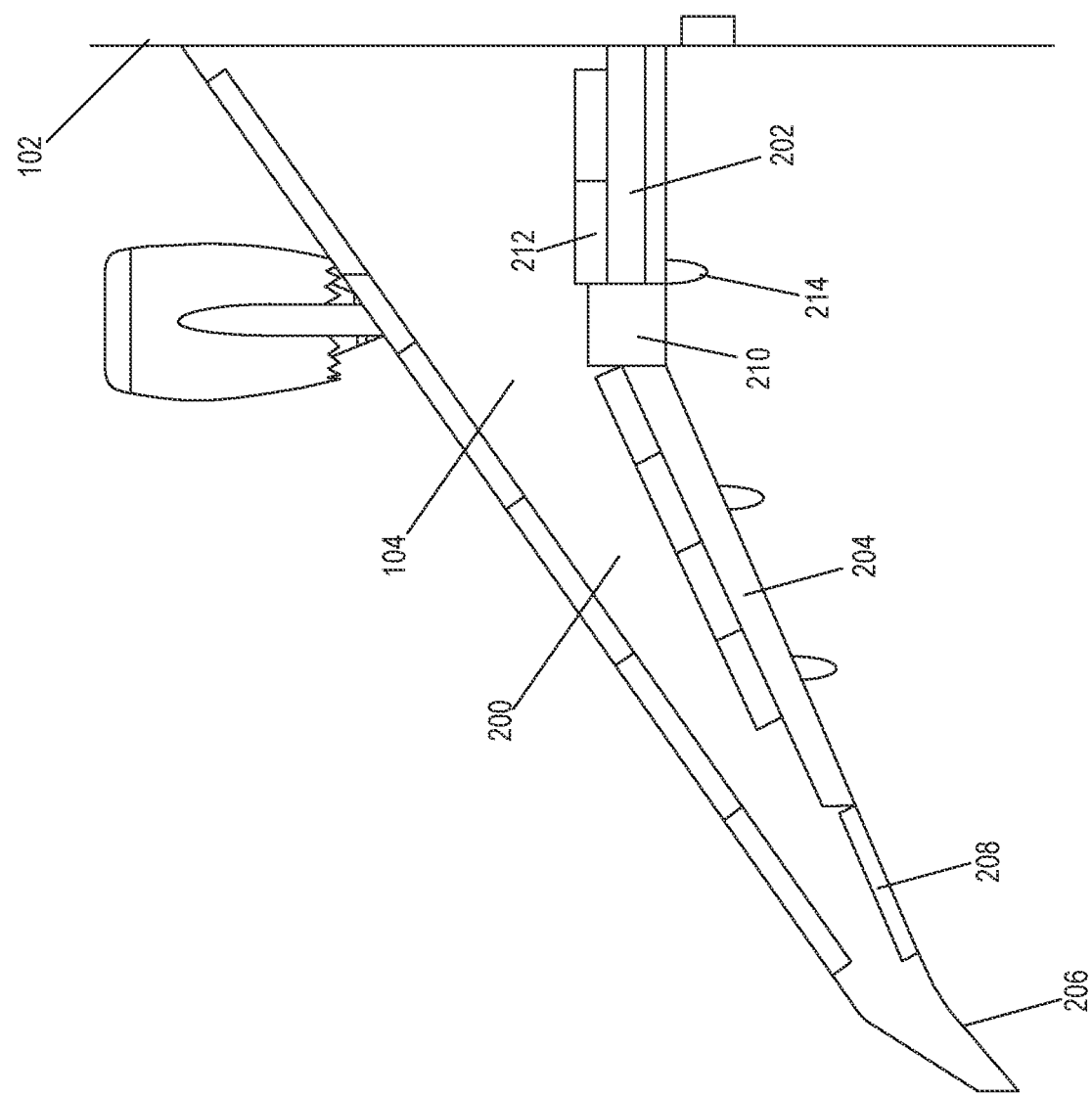
FIG. 2A is a top view of an example wing of the example aircraft of FIG. 1 showing an example configuration of example flaps and flaperons that can be implemented on the example wing.

FIG. 2A is a top view of the first wing 104 showing one example configuration of control surfaces that can be implemented on the first wing 104. The first wing 104 includes a fixed wing structure or portion 200 that is coupled to an extends outward from the fuselage 102. The fixed wing portion 200 can include one or more structural members, such as ribs, spars, fittings, mounts, etc. that are covered by panels or skin.

In the illustrated example of FIG. 2A, the first wing 104 includes a first flap 202 (an inboard flap) and a second flap 204 (an outboard flap) that are moveably coupled to the fixed wing portion 200 of the first wing 104. The first and second flaps 202, 204 are disposed along a trailing edge 206 the fixed wing portion 200. The flaps 202, 204 are primarily used to generate high lift. In particular, the first and second flaps 202, 204 can be moved downward relative to the trailing edge 206 of the first wing 104 to change the shape of the first wing 104 and generate more lift, which is advantageous during takeoff and landing. For example, in the illustrated example of FIG. 2A, the first and second flaps 202, 204 are in a stowed or retracted position. During cruise, for example, the first and second flaps 202, 204 are maintained in this position, which is generally more aerodynamic and fuel efficient. During take-off and landing, for example, the first and second flaps 202, 204 can be moved and/or rotated downward to a deployed or extended position, which increases the effective chord length of the first wing 104 to generate more lift. Flaps are typically considered low-rate devices because they take a longer time to reach full deployment. While in this example the first wing 104 includes two flaps, in other examples, the first wing 104 may include only one flap (e.g., only the first flap 202) or may include more than two flaps.

In the illustrated example of FIG. 2A, the first wing 104 includes an aileron 208 disposed along the trailing edge 206 of the first wing 104. The aileron 208 can be rotated upward or downward relative to the fixed wing portion 200 to cause the aircraft 100 to roll (i.e., rotate about its longitudinal axis), also referred to as lateral motion or lateral control.

In the illustrated example of 2A, the first wing 104 also includes a flaperon 210 disposed along the trailing edge 206 between the first and second flaps 202, 204. The flaperon 210 is a combination flap and aileron that can be used during take-off, landing, cruise, speed braking, and emergency descent. For example, the flaperon 210 can be moved downward relative to the fixed wing portion 200 to help generate lift during take-off and landing similar to the flaps 202, 204, but can also be rotated upward relative to the fixed wing portion 200 to provide roll control similar to the aileron 208. A flaperon is considered a high-rate device because it deploys more quickly than the flaps 202, 204.

In the illustrated example, the first wing 104 also includes a plurality of spoilers 212 (one of which is referenced in FIG. 2A). The spoilers are typically on the top of the fixed wing portion 200 forward of the flaps 202, 204. The spoilers 212 can be deployed to increase drag during braking. The spoilers 212 can also be used for roll control. In some examples, the spoilers 212 are drooping spoilers, which help generate high lift. Similarly, the second wing 106 may include one or more flaps, ailerons, flaperons, spoilers, etc. It is understood that any disclosure relating to the first wing 104 can likewise be applied to the second wing 106. Thus, to avoid redundancy, a description of the second wing 106 is not provided herein.

The first wing 104 includes one or more actuation systems and linkage assemblies for moving the first and second flaps 202, 204 relative to the fixed wing portion 200. The actuation systems can be part of the flap supports that are disposed in flap support fairings 214 (one of which is referenced in FIG. 2A). The first wing 104 also includes one or more actuation systems and linkage assemblies for moving the flaperon 210.

Disclosed herein are example actuation systems and linkage assemblies that can be implemented in connection with the flaps 202, 204 and/or the flaperon 210. The example systems disclosed herein include additional actuators that enable a second degree of freedom of movement, which enables the flap or flaperon to provide greater lift control.

Figure 2B:
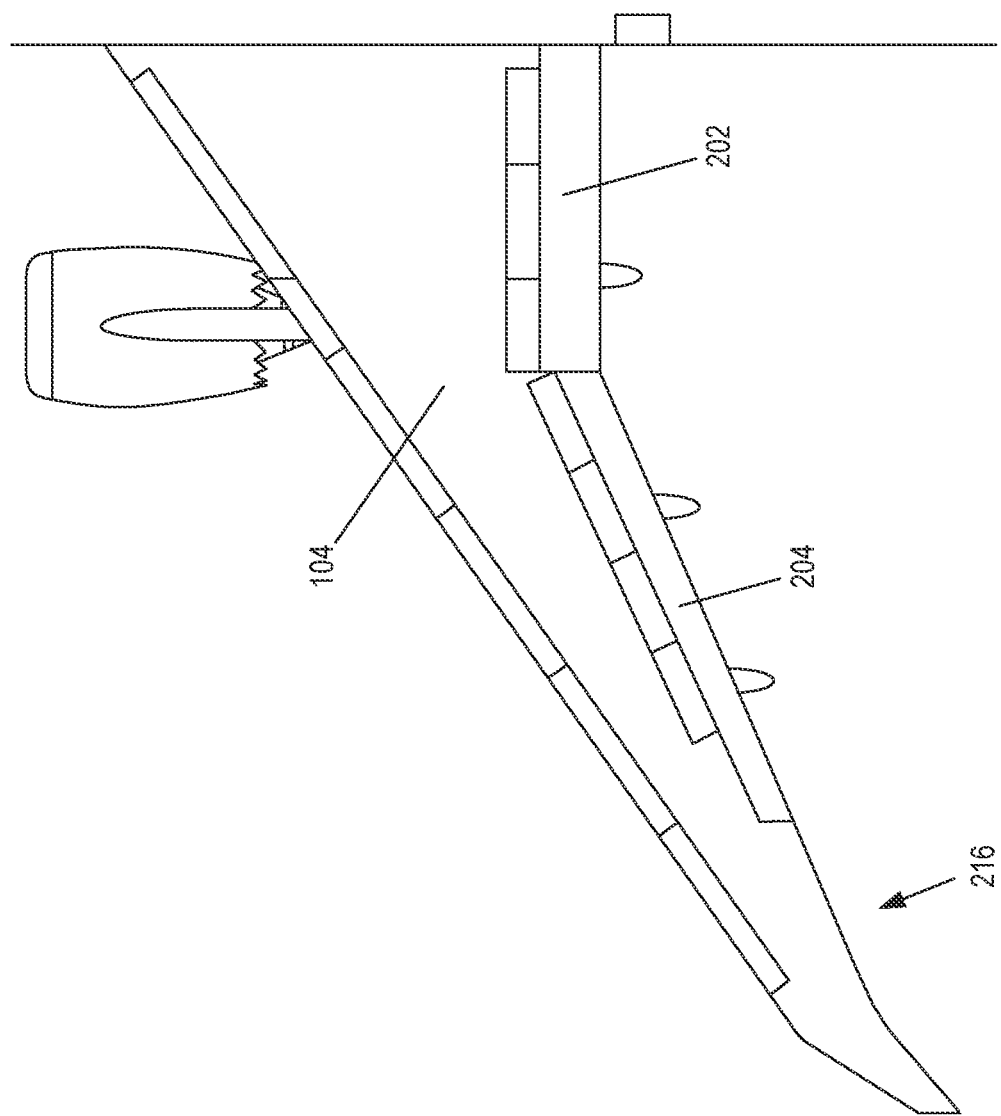
FIG. 2B is a top view of the example wing of the example aircraft of FIG. 1 showing another example configuration of example flaperons that can be implemented on the example wing.

In some examples disclosed herein, the example actuation systems and linkage assemblies enable the flaps 202, 204 to also provide roll control and therefore operate as a flaperon. In such an example, the flaperon 210 and/or the aileron 208 can be eliminated from the first wing 104. For example, FIG. 2B shows another example configuration of control surfaces that can be implemented on the first wing 104. In this example, the first wing 104 includes the first flap 202 and the second flap 204. However, in this example, the first wing 104 does not include the flaperon 210 (FIG. 2A) between the first and second flaps 202, 204. The first flap 202 has been extended outboard to be adjacent to the second flap 204. Further, the first wing 104 does not include the aileron 208 (FIG. 2A) on an outboard portion 216 of the first wing 104. Eliminating the flaperon 210 and the aileron 208 significantly reduces cost and weight associated with such systems on the first wing 104. In this example, the first and second flaps 202, 204 can operate as flaperons and can be referred to as first and second flaperons 202, 204. The example actuation systems and linkage assemblies disclosed herein are described in connection with the first flap 202, which is referred to herein as a first flaperon 202. However, the examples disclosed herein can also be implemented in connection with the second flaperon 204 and/or the flaperon 210 (FIG. 2A). Further, it is understood that any of the examples disclosed herein in connection with the first flaperon 202 of the first wing 104 can likewise be applied to the trailing edge control surfaces of the second wing 106, the horizontal stabilizer 110, and/or the vertical stabilizer 112. Thus, to avoid redundancy, a description of movable trailing edge control surfaces of these components is not provided herein.

Figure 3:
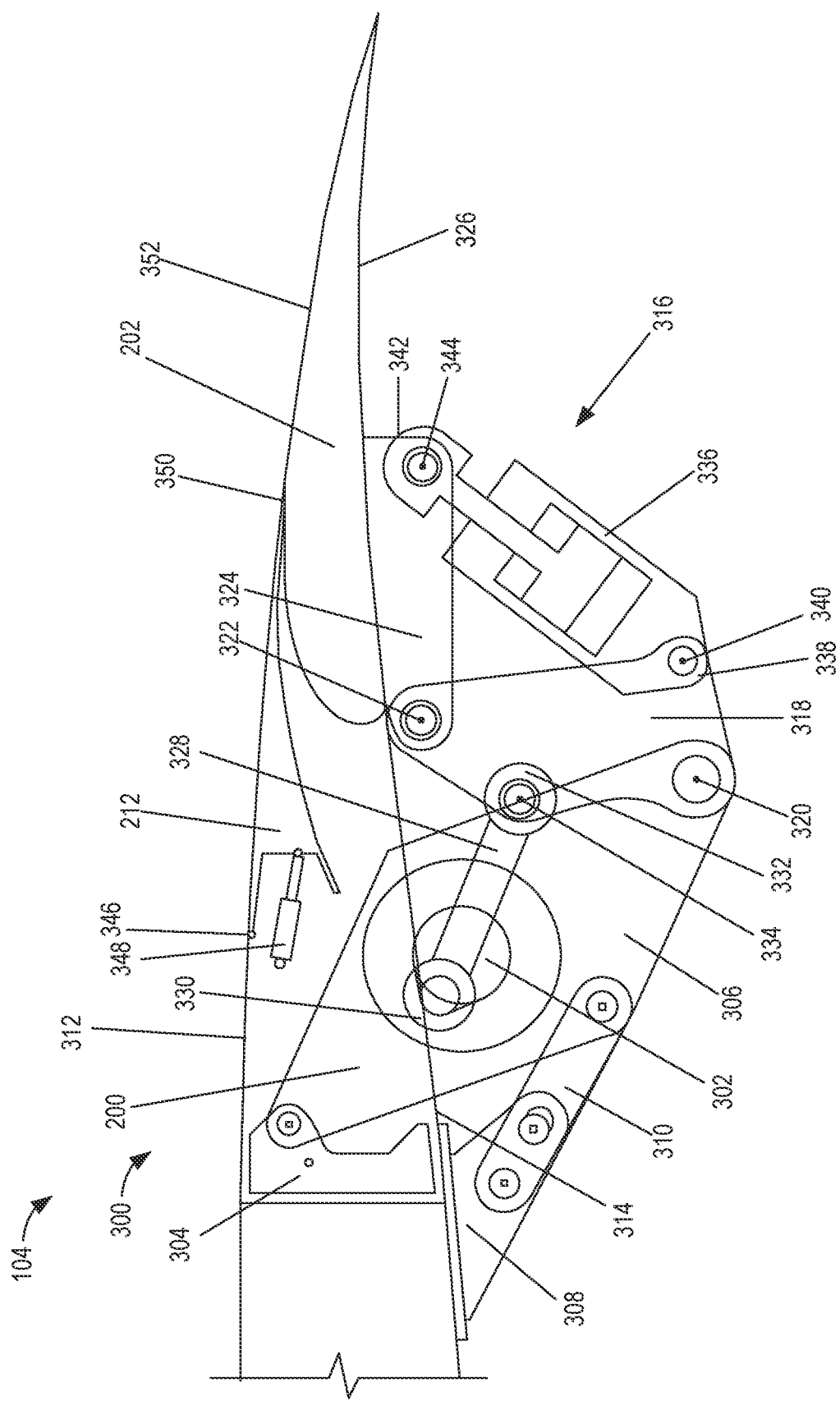
FIG. 3 is a cross-sectional view of the example wing of FIGS. 2A and 2B illustrating an example actuation system that can implemented on the example wing and be used to move the example flaperon.

FIG. 3 is a cross-sectional view of the first wing 104 showing an example actuation system 300 that can be used to move the first flaperon 202 relative to the fixed wing portion 200. In the illustrated example, the actuation system 300 includes a first actuator 302. The first actuator 302 can be activated (e.g., in response to a pilot command) to move the first flaperon 202 along a first degree of freedom relative to the fixed wing portion 200. In FIG. 3, the first flaperon 202 is in a stowed or retracted position, in which the first flaperon 202 is aligned with the fixed wing portion 200. This reduces (e.g., minimizes) drag caused by the first flaperon 202. The first flaperon 202 may be held in the stowed position during cruise, for example. The first actuator 302 can be activated to move the first flaperon 202 to a deployed position in which the first flaperon 202 is moved downward relative to the fixed wing portion 200, shown in further detail herein.

In the illustrated example, the first actuator 302 is coupled to the fixed wing portion 200 of the first wing 104. In this example, the fixed wing portion 200 includes a fitting 304 (which may be coupled to a rear spar), a rib 306, a mount 308, and a link 310 between the mount 308 and the rib 306. The fitting 304, the rib 306, the mount 308, and the link 310 are coupled (e.g., via fasteners, welding, etc.) such that they do not move relative to each other. The fixed wing portion 200 can include other support structures (e.g., spars, ties, etc.). The fixed wing portion 200 also has a top panel 312 and a bottom panel 314, which form the skin of the first wing 104. In the illustrated example, the first actuator 302 is coupled to the rib 306 of the fixed wing portion 200. Additionally or alternatively, the first actuator 302 can be coupled to another fixed structure in the first wing 104, such as the fitting 304 and/or a spar. The first actuator 302 may be a low-rate actuator. In this example, the first actuator 302 is a gear rotary actuator (GRA), which is mechanically powered. However, in other examples, the first actuator 302 can be implemented by another type of actuator (e.g., a linear actuator) and/or can be powered by other means (e.g., hydraulically, and/or electrically actuated).

In the illustrated example of FIG. 3, the example actuation system 300 includes an example linkage assembly 316 coupled between the fixed wing portion 200 and the first flaperon 202. The linkage assembly 316 is configured to move the first flaperon 202 relative to the fixed wing portion 200 in response to activation of the first actuator 302 and/or in response to activation of a second actuator (disclosed in further detail below). In the illustrated example, the linkage assembly 316 includes a rocker 318. The rocker 318 is rotatably coupled to the fixed wing portion 200 at a first pivot 320. Multiple pivots or pivot points are disclosed herein. The pivots can be implemented by any type of joint or coupling such as a hinge, a pin, a journal bearing, and/or a spherical bearing. As shown in FIG. 3, the first flaperon 202 is rotatably coupled to the rocker 318 at a second pivot 322. In this example, the first flaperon 202 has a carrier or carrier beam 324 along a bottom side 326 of the first flaperon 202. In this example, the linkage assembly 316 couples to the first flaperon 202 at the carrier 324. The carrier 324 is rotatably coupled to the rocker 318 at the second pivot 322.

In the illustrated example of FIG. 3, the linkage assembly 316 includes a push rod 328 coupled between the first actuator 302 and the rocker 318. The push rod 328 has a first end 330 and a second end 332 opposite the first end 330. The first end 330 of the push rod 328 is rotatably coupled to the first actuator 302. The second end 332 of the push rod 328 is rotatably coupled to the rocker 318 at a third pivot 334. Therefore, when the first actuator 302 is activated, the first actuator 302 pushes the push rod 328, which rotates the rocker 318 about the first pivot 320, thereby moving the first flaperon 202 along an arcuate path.

In the illustrated example of FIG. 3, the linkage assembly 316 includes a second actuator 336. The second actuator 336 is operable to move the flaperon 202 along a second degree of freedom relative to the fixed wing portion 200. The second actuator 336 is coupled between the rocker 318 and the first flaperon 202. For example, a first end 338 of the second actuator 336 is rotatably coupled to the rocker 318 at a fourth pivot 340, and a second end 342 of the second actuator 336 is rotatably coupled to the carrier 324 of the first flaperon 202 at a fifth pivot 344. The fifth pivot 344 is aft of the second pivot 322. In this example, the second actuator 336 is a linear actuator (e.g., a linear hydraulic actuator). However, in other examples, the second actuator 336 can be implemented by another type of actuator (e.g., a rotary actuator). In FIG. 3, the second actuator 336 is in a neutral position. The second actuator 336 can be activated to extend or retract between an extended position and a retracted position, as shown in further detail. If the second actuator 336 remains in the neutral position, the first flaperon 202 remains in the same position relative to the rocker 318. However, if the second actuator 336 is activated (e.g., extended or retracted), the second actuator 336 rotates or pivots the first flaperon 202 about the second pivot 322 relative to the rocker 318 and, thus, relative to the fixed wing portion 200. This action is used to pitch the first flaperon 202 upward or downward. In this example, the first and second actuators 302, 336 are independently operable. In other words, the first and second actuators 302, 336 can be operated separately. This enables the actuation system 300 to move the first flaperon 202 through a greater range of positions/movement and, thus, provides a greater range of lift control and roll control.

In the illustrated example of FIG. 3, the first wing 104 also includes the spoiler 212, which is forward of the first flaperon 202 on a top of the fixed wing portion 200. The spoiler 212 is rotatably coupled to the fixed wing portion 200 about a pivot 346. The first wing 104 includes a third actuator 348 to move (e.g., rotate) the spoiler 212. The third actuator 348 is independently operable of the first and second actuators 302, 336. The third actuator 348 can be activated to rotate the spoiler 212 upward, which creates drag and can be used for braking. In some examples, the spoiler 212 is a drooping spoiler and can also be rotated downward relative to the fixed wing portion 200. For example, when the first flaperon 202 is deployed downward, the third actuator can be activated to rotate the spoiler 212 upward and downward to keep a trailing edge 350 of the spoiler 212 close to a top side 352 of the first flaperon 202 and reduce flow separation.

Figure 4A:
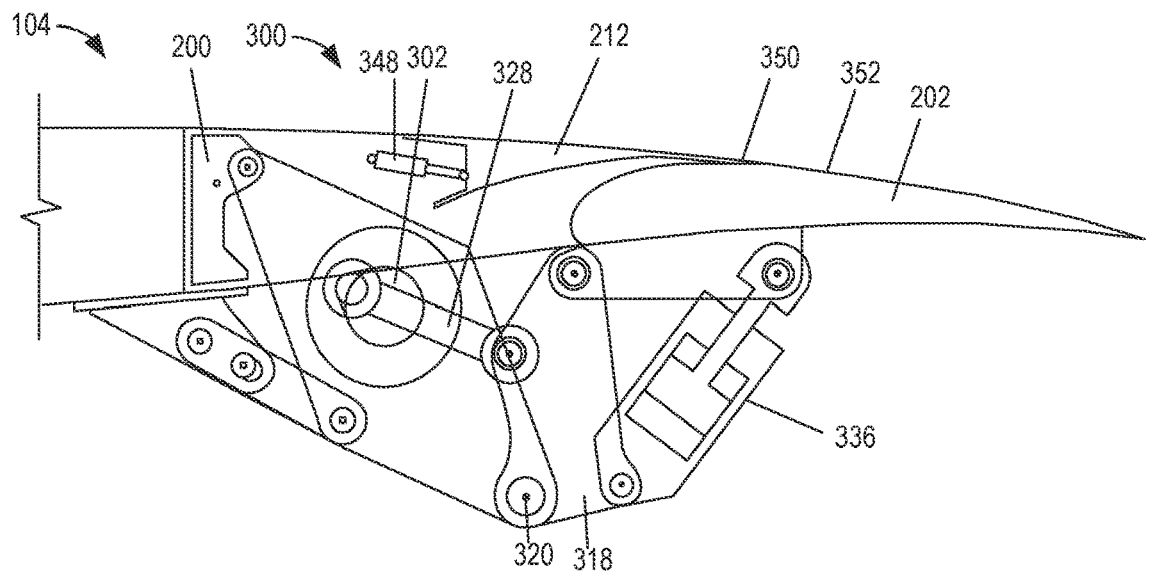
FIGS. 4A-4C show an example sequence in which an example first actuator of the example actuation system of FIG. 3 is activated to move the example flaperon between a stowed position (FIG. 4A) and a deployed position (FIG. 4C).
Figure 4B:
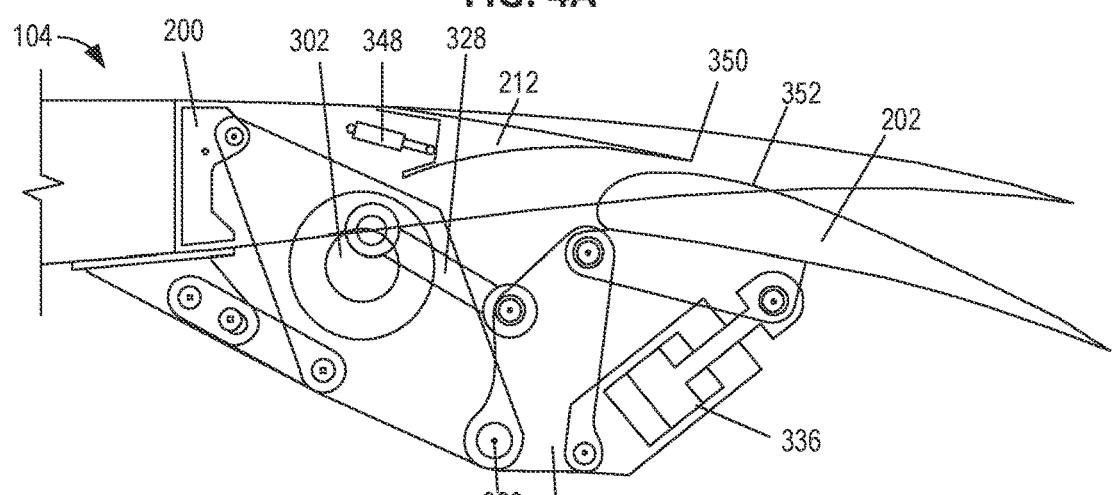
Figure 4C:
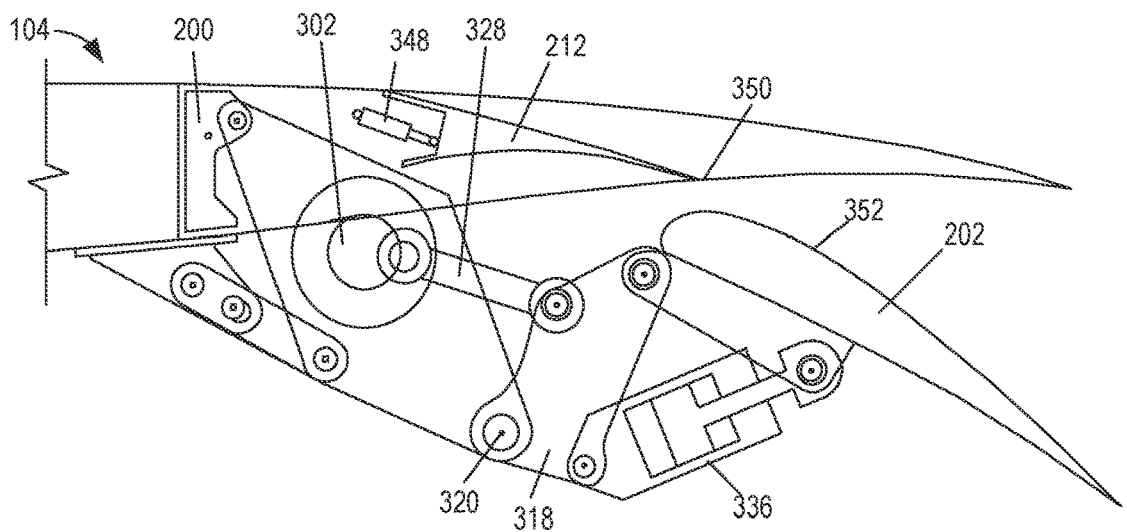

FIGS. 4A-4C show an example sequence in which the first actuator 302 is activated to move the first flaperon 202 downward relative to the fixed wing portion 200. This sequence can be executed to increase lift and drag during take-off or landing, for example. In the example sequence, the first flaperon 202 is moved from a stowed position, as shown in FIG. 4A, to a deployed position, as shown in FIG. 4C. As shown in FIGS. 4A-4C, the first actuator 302 is activated in a clockwise direction. The first actuator 302 moves the push rod 328 to the right in FIGS. 4A-4C, which rotates the rocker 318 about the first pivot 320 and, thus, rotates the first flaperon 202 downward relative to the fixed wing portion 200. Therefore, activation of the first actuator 302 moves the rocker 318 and the first flaperon 202 relative to the fixed wing portion 200. To move the first flaperon 202 back to the stowed position (FIG. 4A), the first actuator 302 can be activated in the reverse direction (counter-clockwise). The stowed position (FIG. 4A) and deployed position (FIG. 4C) may correspond to the limits of first actuator 302. The first actuator 302 can be activated to move and hold the first flap 202 at any position between the stowed position (FIG. 4A) and the deployed position (FIG. 4C). Therefore, the first actuator 302 is operable to move the first flaperon 202 along a first degree of freedom between a stowed position (FIG. 4A) in which the first flaperon 202 is aligned with the fixed wing portion 200 and a deployed position (FIG. 4C) in which the first flaperon 202 is moved downward relative to the fixed wing portion 200.

In the example sequence of FIGS. 4A-4C, the third actuator 348 is activated to rotate the spoiler 212 downward relative to the fixed wing portion when the flaperon 202 is moved downward relative to the fixed wing portion 200, referred to herein as a drooping spoiler configuration. As such, the trailing edge 350 of the spoiler 212 remains close to the top side 352 of the first flaperon 202. This reduces flow separation and helps promote smooth, laminar airflow over the top of the first wing 104. In some examples, the third actuator 348 is activated to move the spoiler 212 simultaneously as the first flaperon 202 is moved. In other examples, the first flaperon 202 may be moved first and then the spoiler 212 may be moved downward.

In the example sequence of FIGS. 4A-4C, the second actuator 336 remains in the same position (e.g., the neutral position) and does not extend or retract. Thus, the second actuator 336 acts as a fixed link. Therefore, the first flaperon 202 remains in the same position relative to the rocker 318. However, in some examples, it may be desired to generate more or less lift. In such an instance, the second actuator 336 can be activated independently of the first actuator 302 to provide more or less lift, as disclosed below in connection with FIGS. 5A and 5B.

Figure 5A:
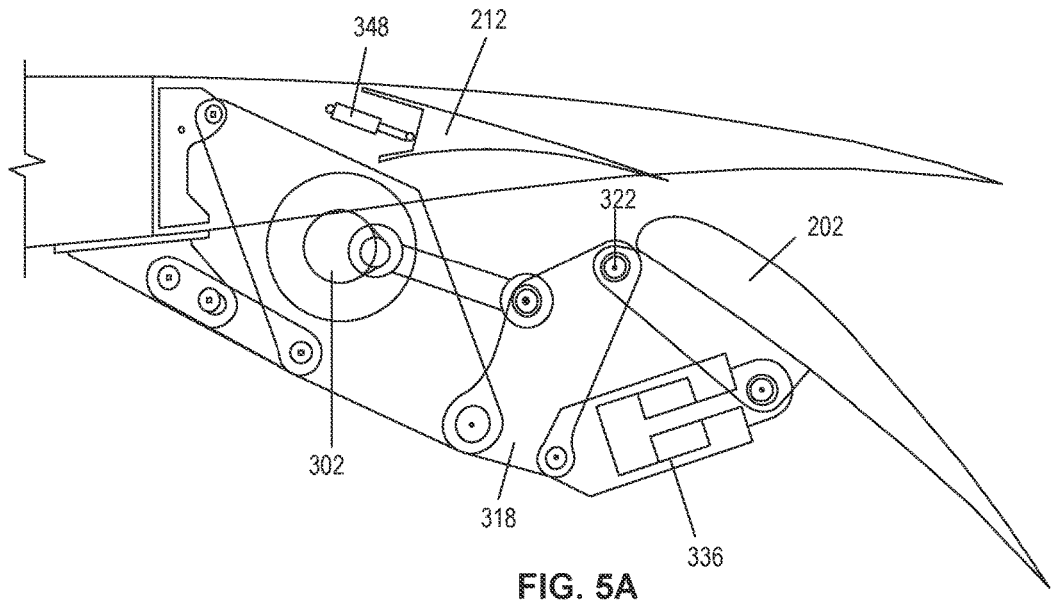
FIGS. 5A and 5B show the example flaperon in the deployed position and illustrate an example second actuator of the example actuation system of FIG. 3 being activated to pitch the flaperon between a downward position (FIG. 5A) and an upward position (FIG. 5B).
Figure 5B:
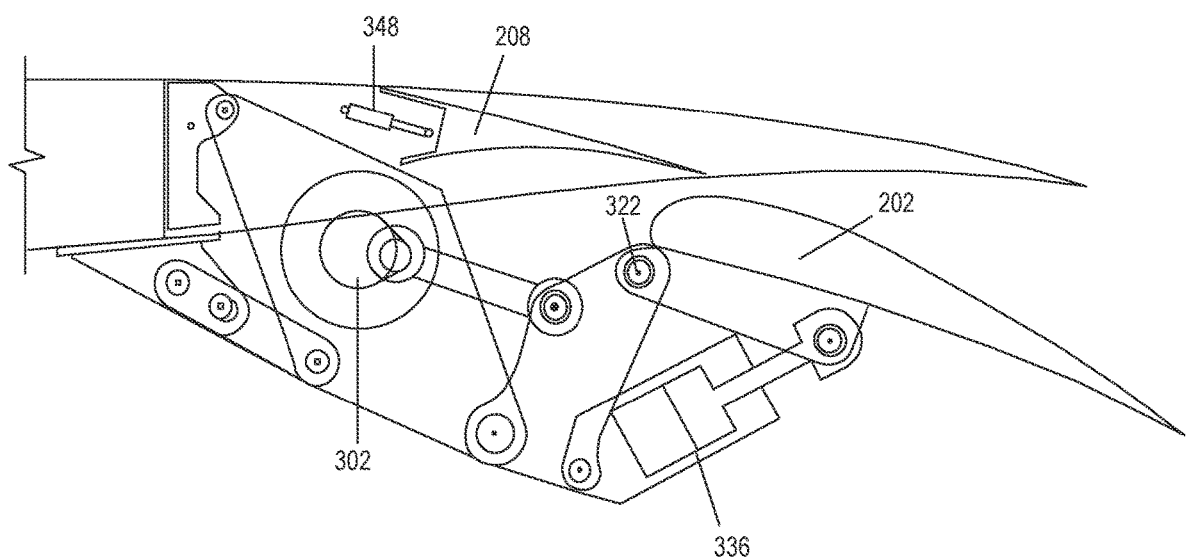

FIGS. 5A and 5B show the first flaperon 202 in the deployed position. While the first flaperon 202 is in this position, the second actuator 336 can be activated to pitch the first flaperon 202 between an upward position (FIG. 5B) and a downward position (FIG. 5A) (and/or any position therebetween). In particular, activation of the second actuator 336 moves the first flaperon 202 relative to the rocker 318. For example, as shown in FIG. 5A, the second actuator 336 has been retracted (as compared to the position shown in FIGS. 4A-4C). This causes the first flap 202 to rotate downward about the second pivot 322, which results in greater lift and drag. As shown in FIG. 5B, the second actuator 336 has been extended (as compared to the position shown in FIGS. 4A-4C). This causes the first flaperon 202 to rotate upward about the second pivot 322, which results in less lift and drag. Therefore, the second actuator 336 is operable to move the first flaperon 202 along a second degree of freedom to pitch the first flaperon 202 between an upward position (FIG. 5B) and a downward position (FIG. 5A) to generate more or less lift and drag. In some examples, the second actuator 336 is a high-rate actuator, which is faster than first actuator 302. Therefore, the second actuator 336 can be used to quickly increase or decrease lift and drag. For example, during take-off or landing, the first flaperon 202 may be fully deployed by the first actuator 302, and then the second actuator 336 can be used to make quick adjustments to the amount of lift and drag, thereby providing better lift control of the aircraft 100 during take-off and landing. Further, in the downward position (FIG. 5A), the first flap 202 is pitched further downward than is capable in known flap configurations. Thus, the example actuation system 300 and linkage assembly 316 enable the first flaperon 202 to generate greater lift and drag than known configurations. Further, the second actuator 336 can pitch the first flaperon 202 upward or downward to provide roll control during take-off and landing. The second actuator 336 can be activated to pitch the first flaperon 202 upward or downward while the first flaperon 202 is at any position between the stowed position (FIG. 4A) and the deployed position (FIG. 4C).

Also, as shown in FIGS. 5A and 5B, the third actuator 348 is activated to rotate the spoiler 212 upward or downward as the first flaperon 202 is pitched upward or downward. This reduces flow separation and helps promote smooth, laminar airflow over the top of the first wing 104. In some examples, the third actuator 348 is activated to simultaneously move the spoiler 212 and as the first flaperon 202 is moved. In other examples, the spoiler 212 can be moved before or after the first flaperon 202.

FIGS. 6A-6F show an example sequence in which the first and second actuators 302, 336 are partially simultaneously activated, which can be used for optimizing lift and drag as well as reducing noise. For example, the sequence shown in FIGS. 6A-6F can be performed during a landing phase. In general, during a landing phase, the flaps and flaperons of an aircraft are typically fully deployed. However, this causes significant audible noise, which is undesirable to the commercial and residential areas surrounding an airport. Therefore, the second actuator 336 can be used to reduce the angle of attack of the first flaperon 202, which reduces the amount of noise generated when the first flaperon 202 is deployed.

Figure 6A:
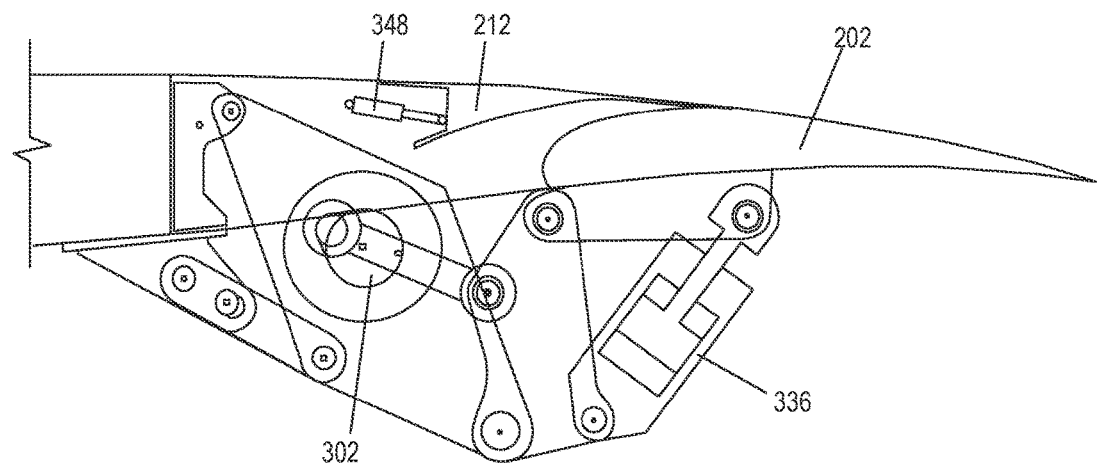
FIGS. 6A-6F show an example sequence of the example actuation system of FIG. 3 during a landing phase and which can be used to reduce noise during landing.
Figure 6B:
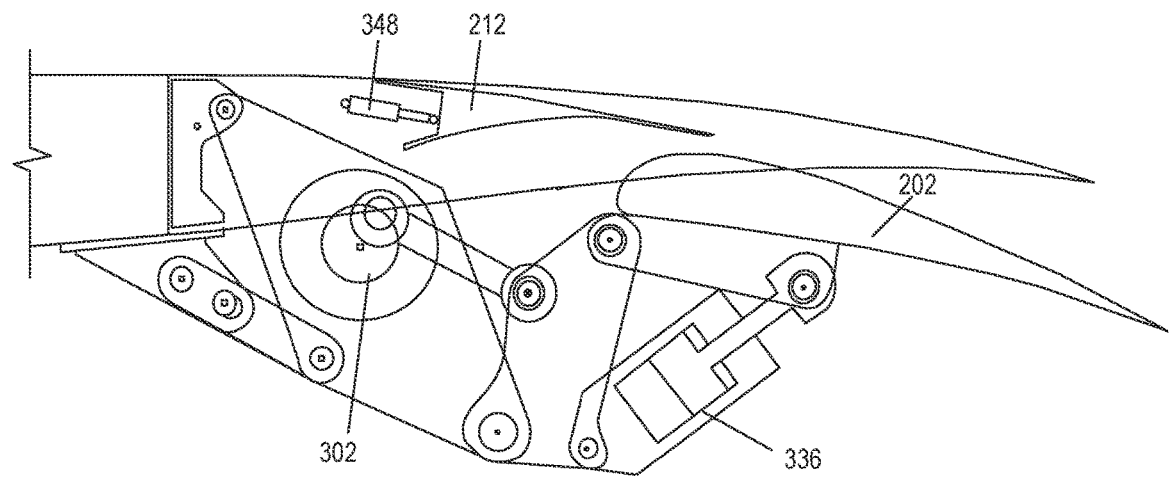
Figure 6C:
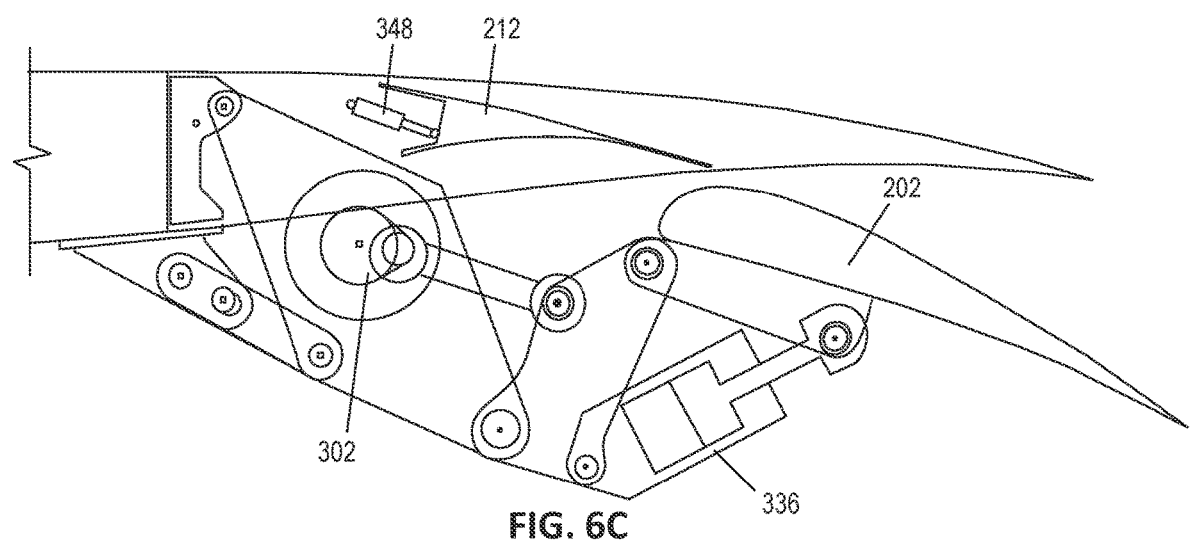

For example, in FIG. 6A, the first flaperon 202 is in the stowed position, and the second actuator 336 is in its neutral position. When the aircraft 100 starts the landing phase (before touchdown), the first actuator 302 can be activated to move the first flaperon 202 downward to the deployed position, as shown in FIGS. 6B and 6C. Further, as shown in FIGS. 6B and 6C, the second actuator 336 is simultaneously activated to pitch the first flaperon 202 upward. This essentially flattens the first flaperon 202, which reduces drag and noise while still providing sufficient lift control for landing.

Figure 6D:
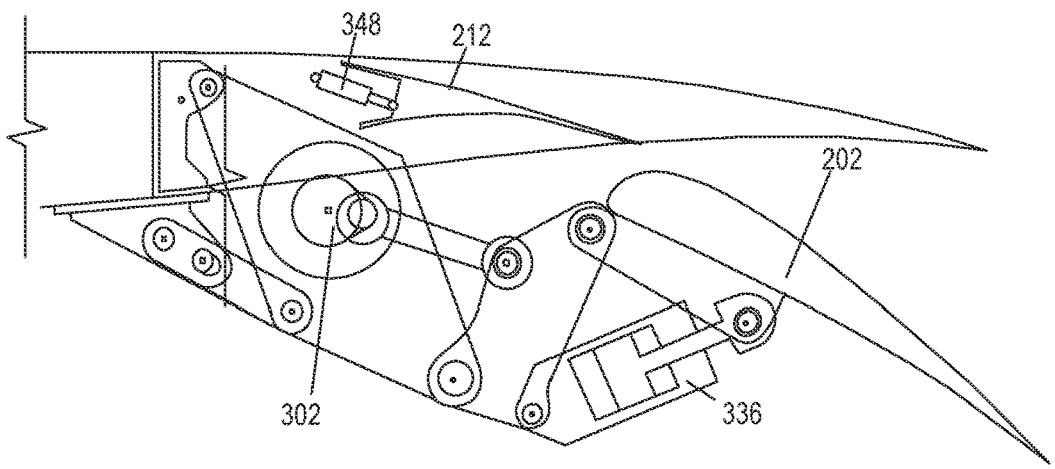
Figure 6E:
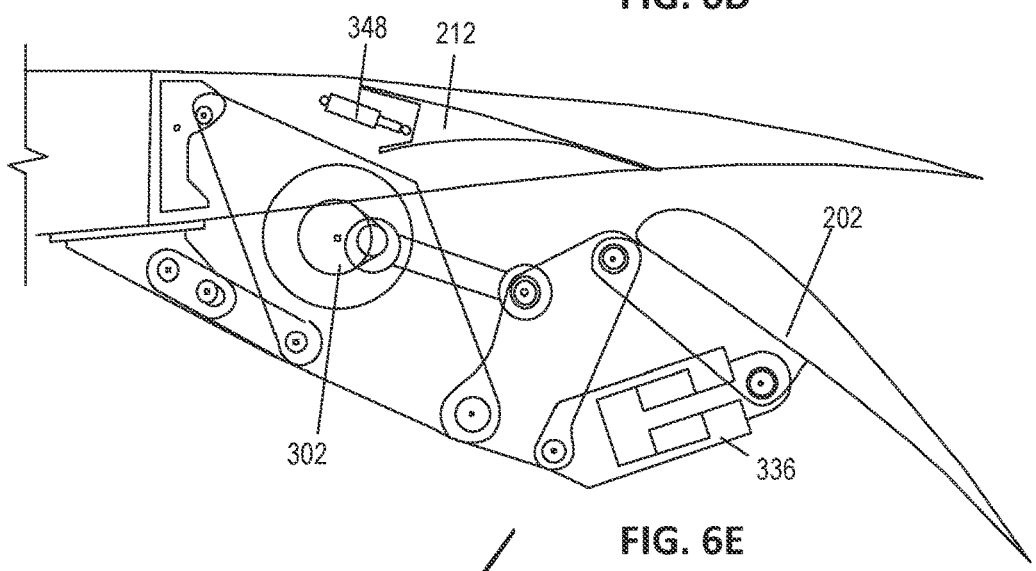
Figure 6F:
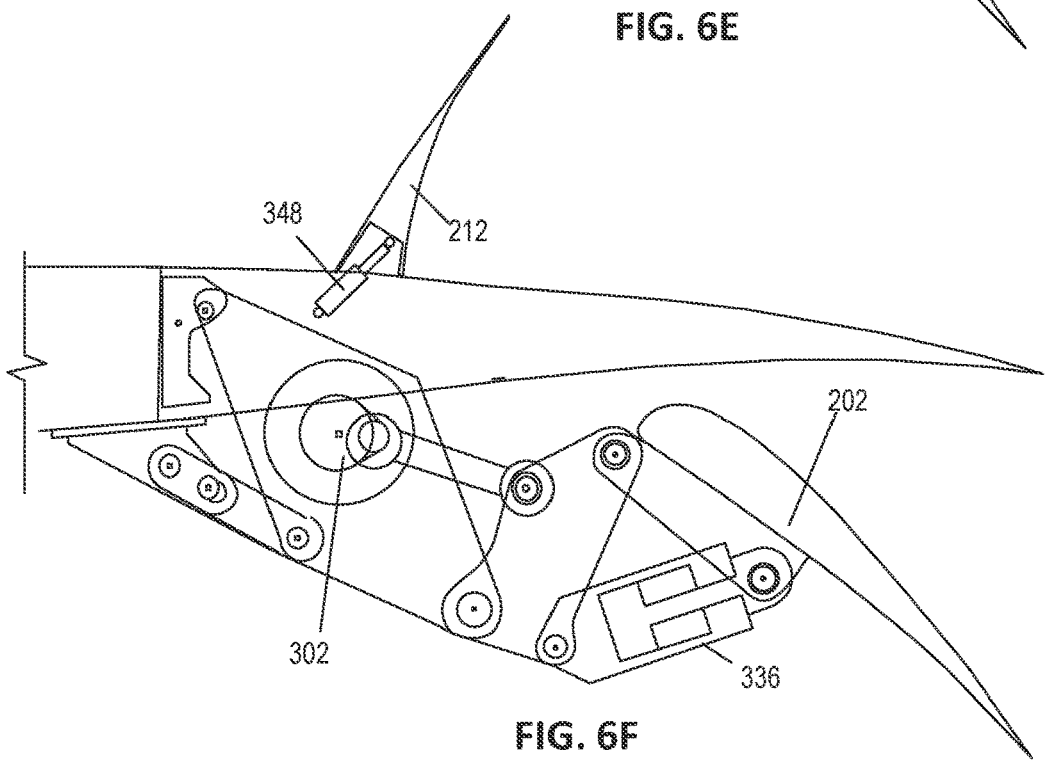

Then, when the aircraft 100 is about to touchdown, the second actuator 336 can be activated to pitch the first flaperon 202 downward as shown in FIGS. 6D and 6E, which provides greater (e.g., maximum) lift but also greater noise. Therefore, this sequence reduces the amount of noise generated during the landing phase over commercial and residential areas, but still enables the first flaperon 202 to generate high lift during the final portion of the landing phase before touchdown. As shown in FIGS. 6A-6E, the third actuator 348 is activated to rotate the spoiler 212 downward. After touchdown, the third actuator 348 is activated to rotate the spoiler 212 upward, as shown in FIG. 6F, which increases drag to provide braking for slowing the aircraft 100.

The example sequence shown in FIGS. 6A-6C can also be used during take-off. For example, during take-off, the second actuator 302 can be activated to deploy the first flaperon 202 and the second actuator 336 can be activated to pitch the first flaperon 202 upward, which reduces drag (and, thus, noise), but still enables a sufficient amount of lift for take-off. Therefore, the example actuation system 300 can be used to optimize lift and drag during take-off and landing as well as reduce noise.

Figure 7A:
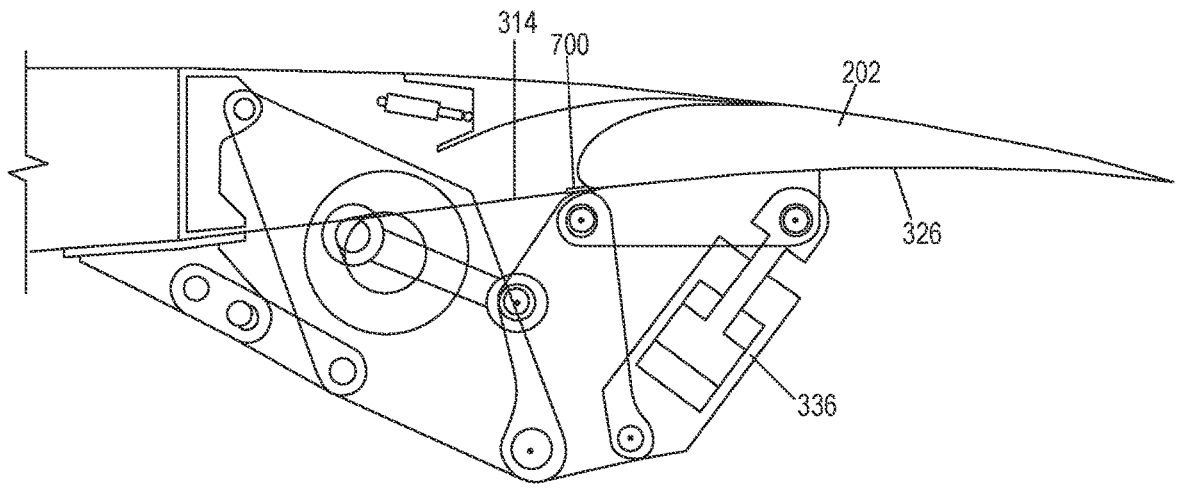
FIGS. 7A-7C show the example flaperon in the stowed position and illustrate the example second actuator of the example flaperon actuation system of FIG. 3 being activated to pitch the flaperon between a downward position (FIG. 7B) and an upward position (FIG. 7C) to roll the aircraft.
Figure 7B:
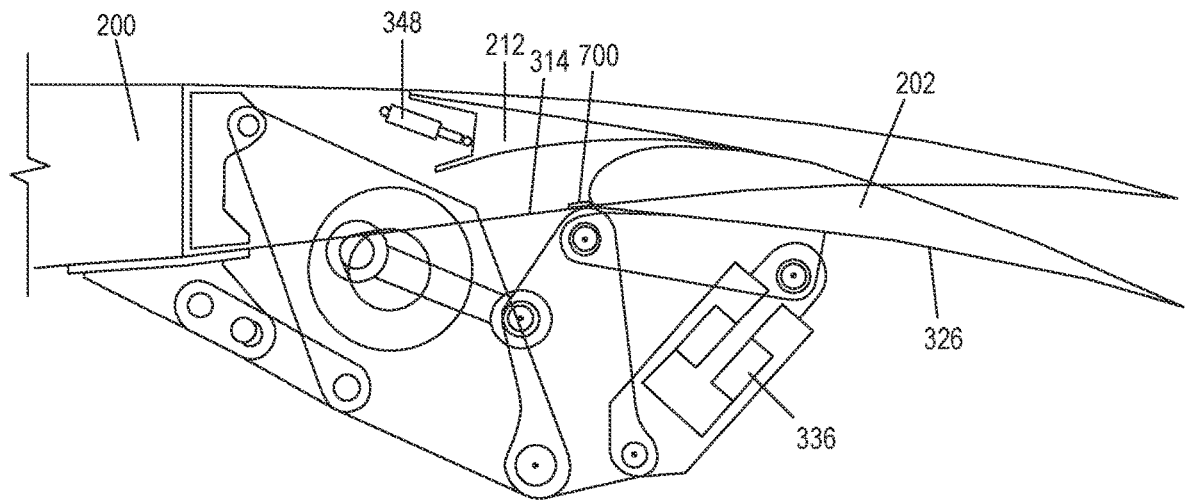
Figure 7C:
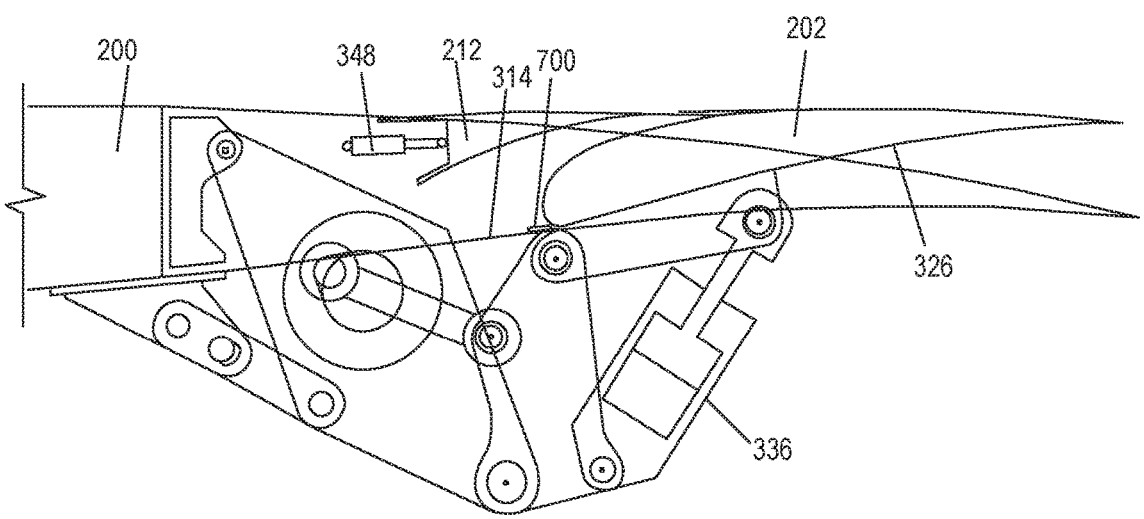

As disclosed herein, the second actuator 336 can be used to pitch the first flaperon 202 upward or downward. In some examples, this movement can be used to control the attitude (e.g., roll) of the aircraft 100. For example, the first flaperon 202 can be used similar to an aileron to roll the aircraft 100, which may be useful during take-off, landing, and/or cruise. FIG. 7A shows the first flaperon 202 in the stowed position and the second actuator 336 in the neutral position. If it is desired to roll the aircraft 100, such as to steer the aircraft 100 during cruise, the second actuator 336 can be activated to pitch the first flaperon 202 upward or downward. For example, in FIG. 7B, the second actuator 336 has been retracted, which pitches the first flaperon 202 downward relative to the fixed wing portion 200. This causes the aircraft 100 to roll in one direction. In FIG. 7C, the second actuator 336 has been extended, which pitches the first flaperon 202 upward relative to the fixed wing portion 200. This causes the aircraft 100 to roll in the opposite direction. This position may be referred to as a trailing edge up. The flaps on the second wing 106 (FIG. 1) can be pitched in the opposite direction. The second actuator 336 can be activated any amount to pitch the first flaperon 202 upward or downward. Thus, this upward or downward movement of the first flaperon 202 can be used to roll the aircraft 100, similar to the use of an aileron. Also, because the second actuator 336 is relatively quick (as compared to the first actuator 302), the second actuator 336 can be used to quickly steer the aircraft 100. Therefore, in some examples, such as shown in FIG. 2B, this enables the aileron 208 to be eliminated from the first wing 104.

Additionally or alternatively, this movement can be used to reduce or alleviate loads on the first wing 104 during certain maneuvers. For example, during a turn or roll, large loads may be imparted on the first wing 104. The second actuator 336 can be activated to pitch the first flaperon 202 upward (FIG. 7C), which reduces loads on the first wing 104.

Also, during cruise, the aircraft 100 burns fuel, which reduces the weight of the aircraft 100 and changes the center of mass of the aircraft 100. The second actuator 336 can be activated to make small adjustments (e.g., pitch upward or downward) of the first flap 220 to maintain the center of mass in the most efficient configuration for cruise. Also, as shown in FIG. 7B the third actuator 348 rotates the spoiler 212 downward relative to the fixed wing portion 200 when the second actuator 336 pitches the first flaperon 202 downward relative to the fixed wing portion 200. Similarly, as shown in FIG. 7C, the third actuator 348 rotates the spoiler 212 upward relative to the fixed wing portion 200 when the second actuator 336 pitches the first flaperon 202 upward relative to the fixed wing portion 200. Therefore the spoiler 212 follows the movements of the first flaperon 202.

As shown in FIGS. 7A-7C, the first wing 104 includes a seal 700 that is coupled to the bottom panel 314 of the fixed wing portion 200. The seal 700 can be, for example, a strip of rubber. The seal 700 extends aft from the bottom panel 314 and covers a space between the bottom panel 314 and the bottom side 326 of the first flaperon 202 when the first flaperon 202 is in the stowed position. When the first flaperon 202 is pitched upward (FIG. 7C) or downward (FIG. 7B), the seal 700 limits or prevents airflow between the bottom panel 314 and the first flaperon 202. This may be beneficial during cruise to maintain a smooth, laminar airflow along the bottom side of the first wing 104. The example seal 700 can be relatively small because the first flaperon 202 in this instance only pivots up or down and does not move forward or aft.

FIGS. 8A-8D show another example actuation system 800 that can be implemented in connection with the example aircraft 100 (FIG. 1). The example actuation system 800 is described in connection with the first flaperon 202 on the first wing 104. The actuation system 800 can be used to move the first flaperon 202 relative to the fixed wing portion 200. The example actuation system 800 can be similarly implemented in connection with the second flaperon 204 (FIG. 2B) and/or the flaperon 210 (FIG. 2A).

Figure 8A:
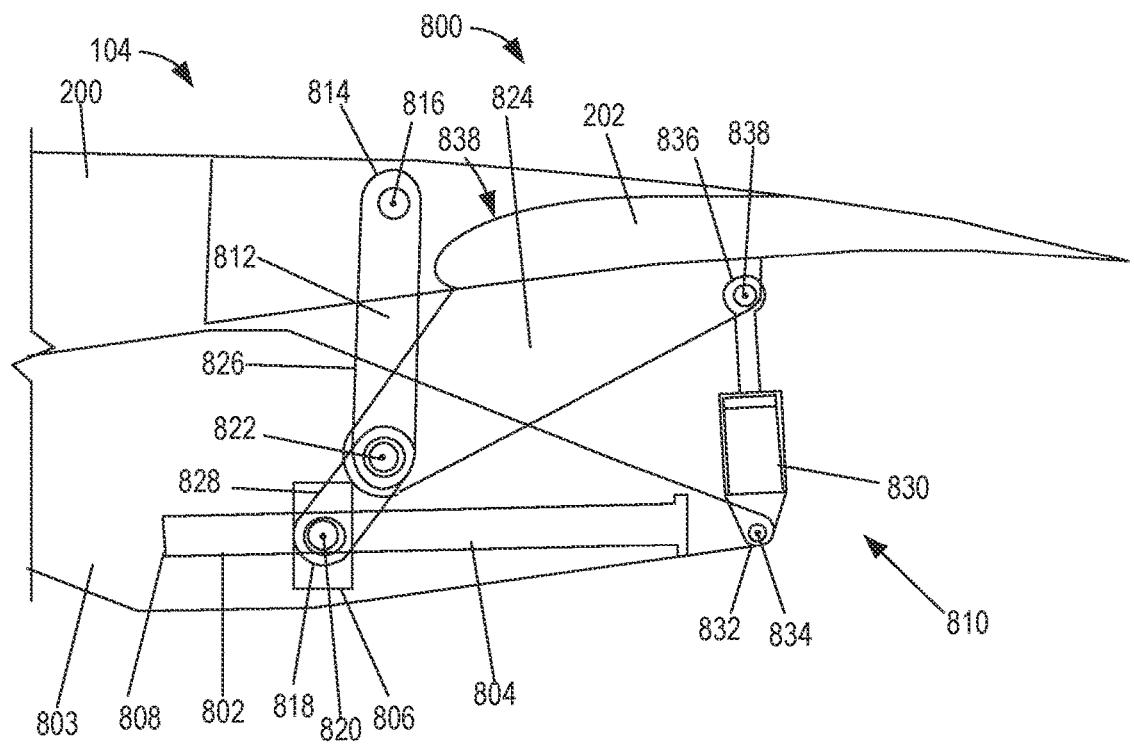
FIGS. 8A-8D illustrate another example actuation system that can be implemented on the example wing of FIGS. 2A and 2B to move an example flaperon.
Figure 8B:
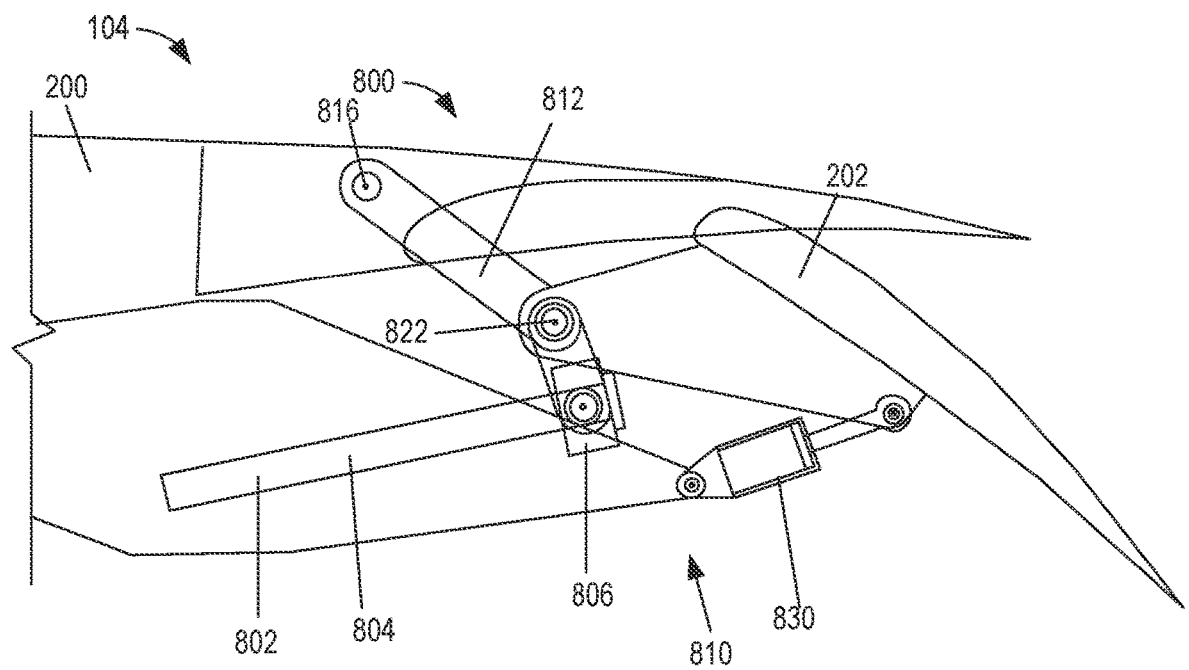

In the illustrated example of FIG. 8A, the actuation system 800 includes a first actuator 802, which may be a low-rate actuator. The first actuator 802 is coupled to the fixed wing portion 200. In this example, the fixed wing portion 200 includes a underwing beam 803 that extends downward from a bottom side of the first wing 104. The first actuator 802 is coupled to the underwing beam 803 of the fixed wing portion 200. The first actuator 802 can be activated (e.g., in response to a pilot command) to move the first flaperon 202 relative to the fixed wing portion 200. The first actuator 802 is configured to move the first flaperon 202 in a similar manner as the first actuator 302 (disclosed above) between a stowed position shown in FIG. 8A and a deployed position as shown in FIG. 8B along a first degree of freedom. However, in this example, the first actuator 802 is a linear actuator, such as a ball screw actuator. The first actuator 802 includes a shaft 804 (e.g., a screw) and a nut 806 (sometimes referred to as a ball or gimbal assembly) that is moveable along the shaft 804. In the illustrated example, an end 808 of the shaft 804 is rotatably (e.g., pivotably) coupled to the underwing beam 803 of the fixed wing portion 200.

In the illustrated example of FIG. 8A, the example actuation system 800 also includes an example linkage assembly 810 coupled between the fixed wing portion 200 and the first flaperon 202. The linkage assembly 810 is configured to move the first flaperon 202 relative to the fixed wing portion 200 in response to activation of the first actuator 802 and/or in response to activation of a second actuator (disclosed in further detail below). In the illustrated example, the linkage assembly 810 includes a rocker 812 (which may also be referred to as a drive arm or crank arm). A first end 814 of the rocker 812 is rotatably coupled to the fixed wing portion 200 at a first pivot 816. A second end 818 of the rocker 812, opposite the first end 814, is rotatably coupled to the nut 806 of the first actuator 802 at a second pivot 820. Thus, the rocker 812 is coupled between the fixed wing portion 200 and the first actuator 802. The first flaperon 202 is rotatably coupled to the rocker 812 at a third pivot 822 between the first and second ends 814, 818. In this example, the first flaperon 202 has an extended carrier 824 referred to herein as the flaperon carrier beam 824. The rocker 812 is rotatably coupled to the flaperon carrier beam 824 at the third pivot 822. In the illustrated example, the rocker 812 has a first portion 826 (e.g., an arm or leg) between the first end 814 and the first flaperon 202 (i.e., at the third pivot 822), and a second portion 828 between the between the second end 818 and the first flaperon 202 (i.e., at the third pivot 822). In the illustrated example, the first and second portions 826, 828 are angled relative to each other. Additionally, as shown in FIG. 3, the first portion 826 is longer than the second portion 828. In other examples, the first and second portions 826, 828 can be angled differently or have another configuration, an example of which is disclosed in connection with FIGS. 9A-9D. Additionally or alternatively, the first actuator 802 can be coupled to the rocker 812 in another location (e.g., between the first pivot 816 and the third pivot 822).

In the illustrated example, the linkage assembly 810 includes a second actuator 830 coupled between the fixed wing portion 200 and the first flaperon 202. For example, as shown in FIG. 8A, a first end 832 of the second actuator 830 is rotatably coupled to the fixed wing portion 200 at a fourth pivot 834 and a second end 836 of the second actuator 830 is rotatably coupled to the flaperon carrier beam 824 of the first flaperon 202 at a fifth pivot 838. In this example, the second actuator 830 is a linear actuator (e.g., a linear hydraulic actuator) that can extend or retract. However, in other examples, the second actuator 336 can be implemented by another type of actuator (e.g., a rotary actuator). The first and second actuators 802, 830 are independently operable.

In FIG. 8A, the first flaperon 202 is in a stowed position. In the stowed position, the first flaperon 202 is partially disposed in a cavity or cutout 838 in the first wing 104. The first actuator 802 can be activated to move the first flaperon 202 from the stowed position, as shown in FIG. 8A, to a deployed position, as shown in FIG. 8B. For example, when the first actuator 802 is activated, the nut 806 is moved along the shaft 804. This swings the rocker 812 about the first pivot 816, which moves the third pivot 822 to the right in FIG. 8B. As a result, the first flaperon 202 is rotated downward relative to the fixed wing portion 200 to the deployed position. The first actuator 802 can be activated in the reverse direction to move the first flaperon 202 from the deployed position (FIG. 8B) back to the stowed position (FIG. 8A). The stowed position (FIG. 8A) and deployed position (FIG. 8B) may correspond to the limits of the first actuator 802. The first actuator 802 can be activated to move the first flaperon 202 to any position between the stowed position (FIG. 8A) and the deployed position (FIG. 8B). Therefore, the first actuator 802 is operable to move the first flaperon 202 along a first degree of freedom between a stowed position (FIG. 8A) in which the first flaperon 202 is aligned with the fixed wing portion 200 and a deployed position (FIG. 8B) in which the first flaperon 202 is moved downward relative to the fixed wing portion 200.

Figure 8C:
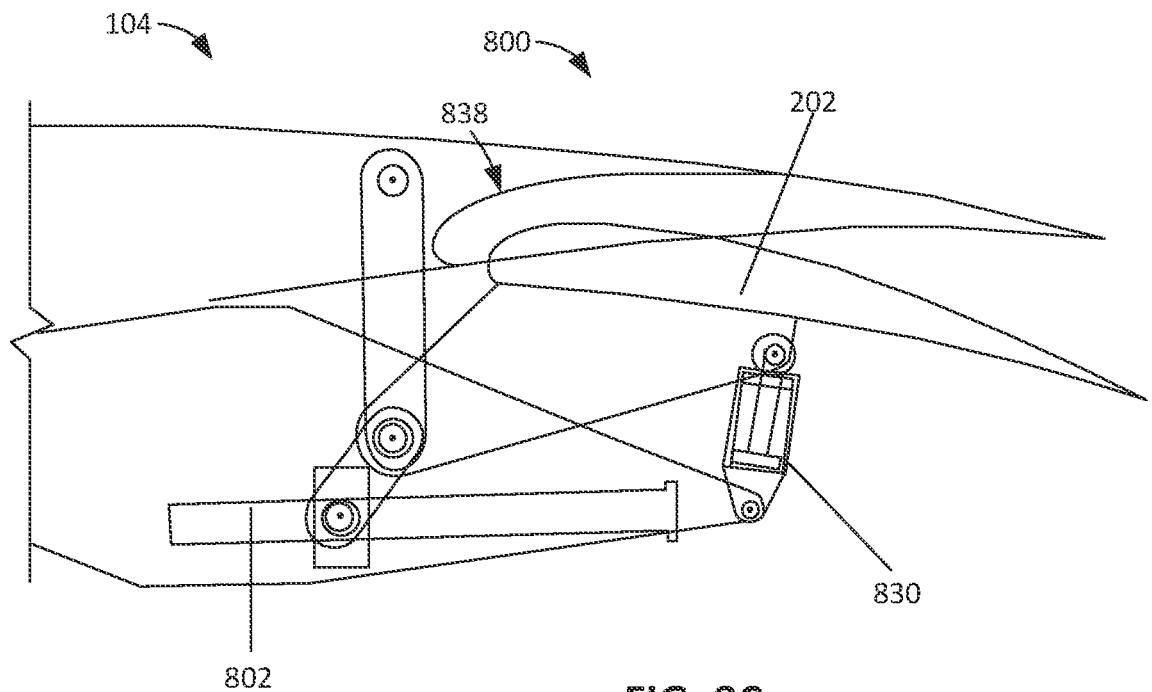

In the sequence of FIGS. 8A and 8B, the second actuator 830 remains in an extended position and, thus, acts as a fixed link. However, in some examples, it may be desired to generate more or less lift and/or roll the aircraft. In such an instance, the second actuator 830 can be activated to pitch the first flaperon 202 upward or downward. For example, as shown in FIG. 8C, the first actuator 802 is in a fully stowed position, and the second actuator 830 has been retracted, which pitches the first flaperon 202 downward relative to the position shown in FIG. 8A. The second actuator 830 can pitch the first flaperon 202 upward and downward between these two positions (FIGS. 8A and 8C), which enables the first flaperon 202 to act as an aileron to roll the aircraft 100. In some examples, the second actuator 830 is a high-rate actuator, which enables the first flaperon 202 to move relatively quickly. In this example, the first wing 104 does not include a spoiler. The first flaperon 202 is stowed in the cavity 838 formed in the fixed wing portion 200. Therefore, in this example, the first flaperon 202 does not pitch upward from the stowed position shown in FIG. 8A. This may be referred to as a trailing edge down only configuration. This type of configuration enables spoiler simplification and control law simplification. However, in other examples, a spoiler can be disposed forward of the first flaperon 202 and operate the same as the spoiler 212 disclosed in connection with FIGS. 3-7C.

Figure 8D:
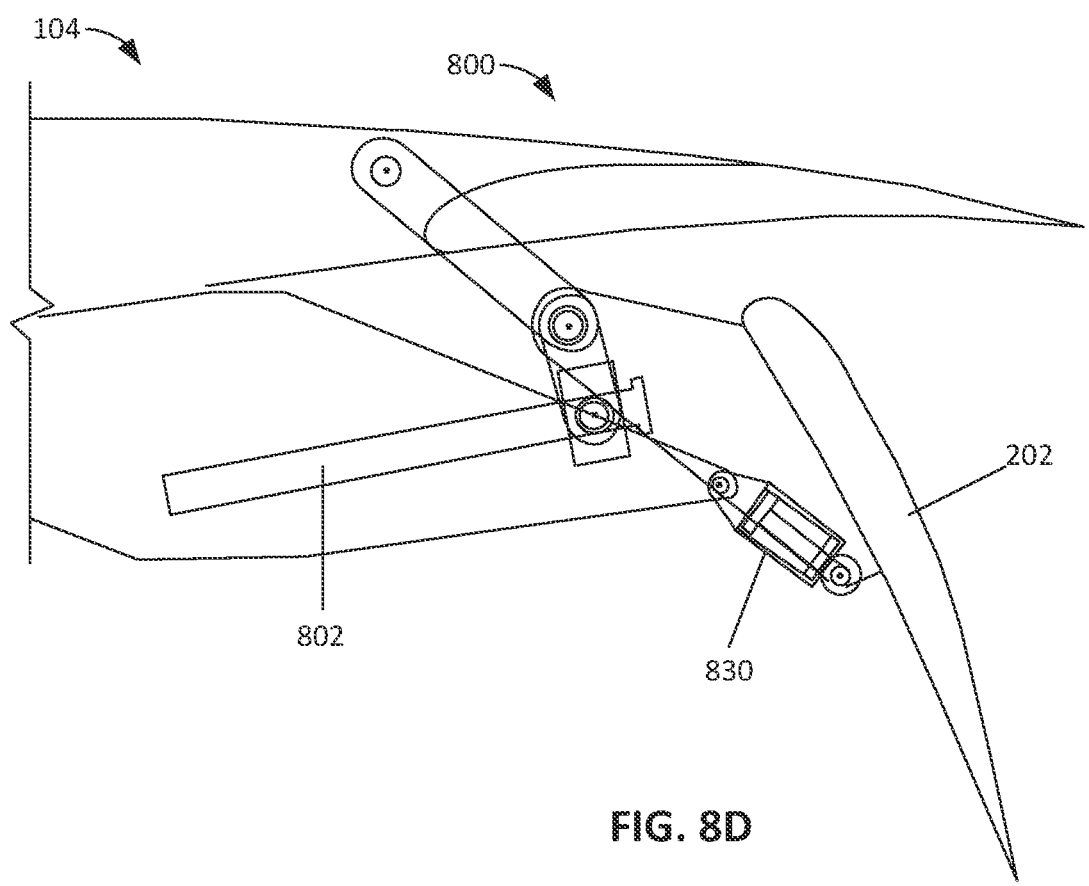

In FIG. 8D, the first actuator 802 is in its fully extended position, similar to FIG. 8B. In FIG. 8D, the second actuator 830 has been extended, which pitches the first flaperon 202 downward relative to the position shown in FIG. 8B. This increases the lift generated by the first wing 104. The second actuator 830 can pitch the first flaperon 202 upward and downward between these two positions (FIGS. 8B and 8D), which enables the first flaperon 202 to generate more or less lift. Therefore, the second actuator 830 is operable to move the first flaperon 202 along a second degree of freedom to pitch the first flaperon 202 between an upward position (FIG. 8A, 8B) and a downward position (FIG. 8C, 8D) to generate more or less lift and drag. The second actuator 830 can be activated simultaneously as the first actuator 802 or separately from the second actuator 802.

The example actuation system 800 provides for better integration with the first wing 104 than known actuation systems. For example, the underwing beam arrangement shown in FIGS. 8A-8D is better for thinner loft wings. This may also allow for better spoiler clearance, enable the use of another mechanism, enable greater flaperon range of motion (e.g., may be better for high fowler configurations), and provide more lift authority due to flap gaps at cruise with the trailing edge down.

The example actuation system 800 can be controlled similar to the actuation system 300 disclosed above and used for various applications for controlling lift, drag, roll, etc. during take-off, landing, and cruise. Therefore, to avoid redundancy, a description of these scenarios is not repeated. However, it is understood that any of the example operations and/or sequences disclosed in connection with the actuation system 300 can likewise apply to the actuation system 800. The example configuration enables better control of lift, drag, and noise reduction than known flap and flaperon actuation systems.

FIGS. 9A-9D show another example actuation system 900 that can be implemented in connection with the example aircraft 100 (FIG. 1). The example actuation system is 900 described in connection with the first flaperon 202 on the first wing 104. The example actuation system 900 can be similarly implemented in connection with the second flaperon 204 (FIG. 2B) and/or the flaperon 210 (FIG. 2A). The actuation system 900 is substantially similar to the actuation system 800 disclosed above. To avoid redundancy, the example parts or components of the actuation system 800 are labeled in FIGS. 9A-9D as 900 series numbers.

Figure 9A:
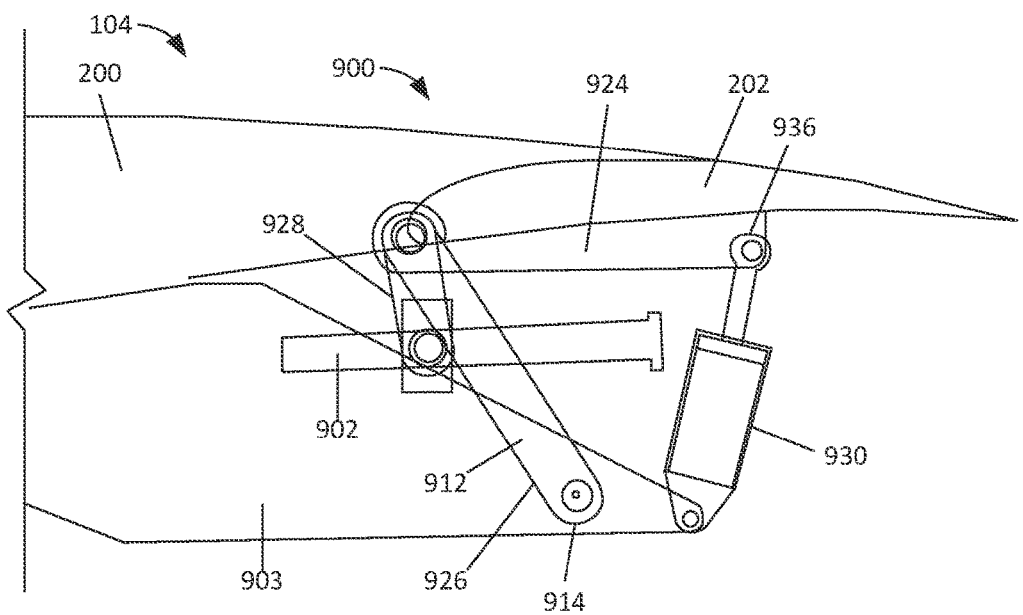
FIGS. 9A-9D illustrate another example actuation system that can be implemented on the example wing of FIGS. 2A and 2B to move an example flaperon.
Figure 9B:
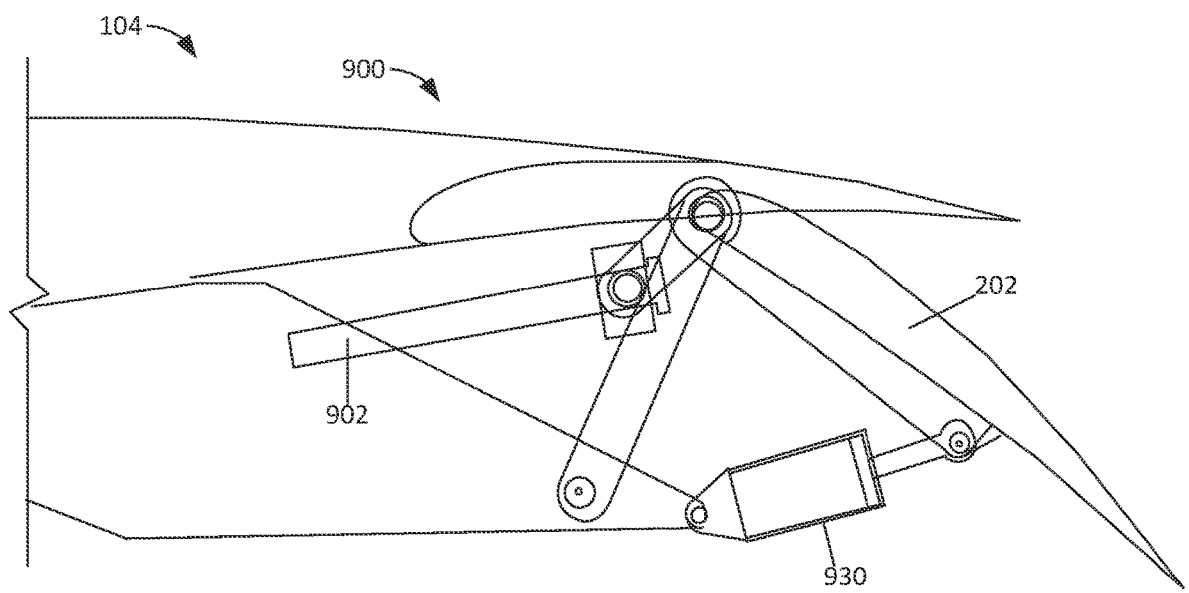
Figure 9C:
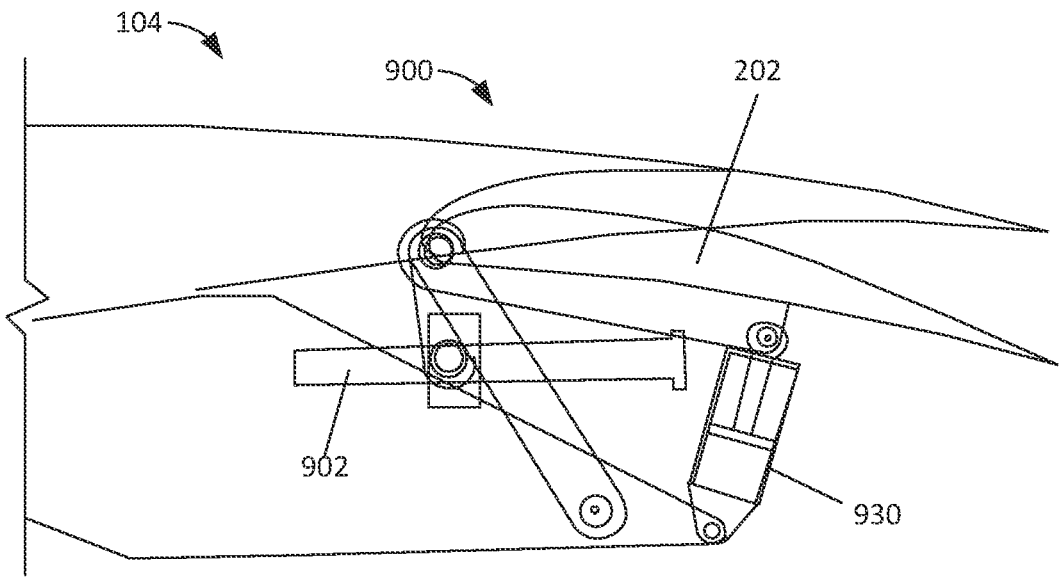
Figure 9D:
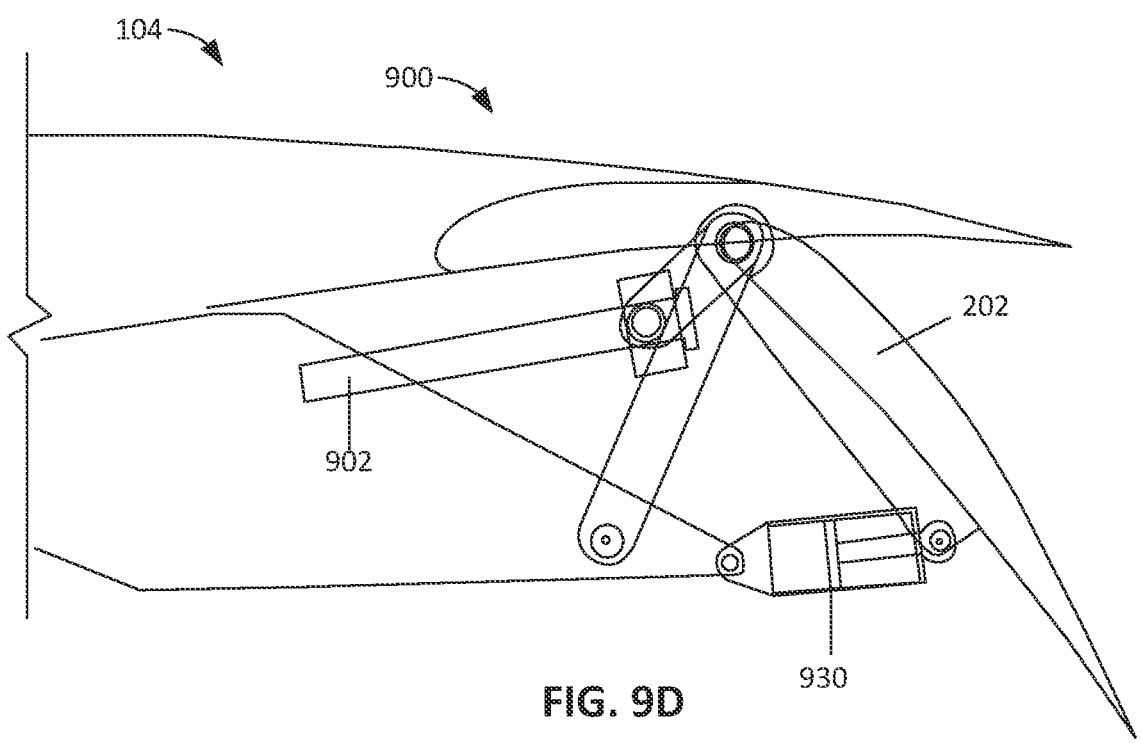

As shown in FIG. 9A, the first actuator 902 is coupled to the fixed wing portion 200 at a location that is higher than the first actuation 802 in FIG. 8A. Also, the first end 914 of the rocker 912 is coupled to the fixed wing portion 200 at or near a distal end of the underwing beam 903. In the illustrated example, the angle between the first and second portions 926, 928 of the rocker 912 is relatively small. Further, in FIG. 9A, the first flaperon 202 has a smaller carrier 924, and the second end 936 of the second actuator 930 is coupled to the carrier 924 near an aft end of the carrier 924. The first and second actuators 902, 930 can be activated to move the first flaperon 202 along the same paths as disclosed in connection with FIGS. 8A-8D. FIGS. 9A-9D correspond to the same positions as FIGS. 8A-8D and, thus, are not repeated herein.

The example actuation systems 300, 800, 900 can enable high fowler flap benefits, such as more low speed lift and longer span capabilities. Further, the example actuations systems 300, 800, 900 are capable of high-rate angle changes, which are beneficial for roll control capabilities, speed break capabilities, reduced demand on spoilers and ailerons (if used), and opportunities to eliminate spoilers and ailerons. The example actuation systems 300, 800, 900 are also compact and can fit within existing flap support fairings. Thus, additional drag generated by use of the example actuation systems 300, 800, 900 may be reduced. Also, the use of two actuators can provide a fail-safe. For example, if one of the actuators becomes inoperable, the other actuator can still be used to at least partially control the flap or flaperon.

Figure 10:
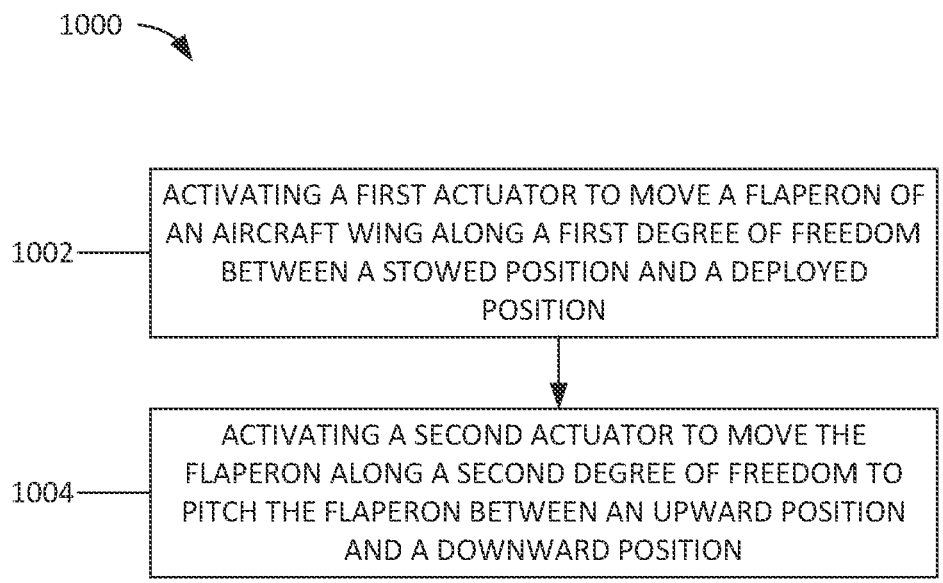
FIG. 10 is a flowchart representative of an example method of controlling the example actuation systems disclosed herein.

FIG. 10 is an example method 1000 that can be implemented in connection with any of the example actuation systems 300, 800, 900 to move a flaperon of an aircraft wing.

The example method is described in connection with the actuation system 300. However, it is understood that the example method can be similarly performed in connection with the actuation system 800 or the actuation system 900.

At block 1002, the method 1000 includes activating the first actuator 302 to move the first flaperon 202 of the first wing 104 along a first degree of freedom between the stowed position (e.g., FIG. 4A) and the deployed position (FIG. 4C). For example, during take-off or landing, the first actuator 302 may be activated to move the first flaperon 202 to the deployed position, which generates more lift. During cruise, the first actuator 302 can be activated in the reverse direction to move the first flaperon 202 back to the stowed position.

At block 1004, the method 1000 includes activating the second actuator 336 to move the first flaperon 202 along a second degree of freedom to pitch the first flaperon 202 between an upward position and a downward position. This action can be used to control the aircraft 100 and/or provide enhanced lift control. For example, when the first flaperon 202 is in the deployed position, such as during take-off or landing, the second actuator 336 can be activated to pitch the first flaperon 202 upward or downward, which changes the amount of lift generated by the first wing 104. Thus, the second actuator 336 can be used to quickly adjust the amount of lift, which provides enhance lift control. In some examples, the activating of the first actuator 302 and the activating of the second actuator 336 occur simultaneously, such as shown in FIGS. 6A-6C. In other examples, the activating of the first actuator 302 and the activating of the second actuator 336 occur at different times, such as shown in FIGS. 4A-4C, 5A, and 5B. Further, the second actuator 336 can be activated independently of the first actuator 302 to pitch the first flaperon 202 upward or downward to provide roll control, as shown in FIGS. 7A-7C.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example apparatus, systems, methods, and articles of manufactured have been disclosed that provide a second degree of freedom for a flap or flaperon of an aircraft wing. The examples disclosed herein provide an adaptable variable camber trailing edge design that enables a flap or flaperon to be used for high lift, roll control, drag reduction, noise reduction, lift redistribution and/or load reduction. This provides a variable camber trailing edge. The examples disclosed herein also enable the elimination of ailerons (and/or one or more additional flaperons), which reduces the number of systems on the aircraft and, thus, results in less cost and less weight (and, thus, is more fuel efficient).

The following paragraphs provide various examples of the examples disclosed herein:

Example 1 is an aircraft comprising a wing including a fixed wing portion, a flaperon, and an actuation system. The actuation system includes a first actuator coupled to the fixed wing portion. The first actuator is operable to move the flaperon along a first degree of freedom between a stowed position in which the flaperon is aligned with the fixed wing portion and a deployed position in which the flaperon is moved downward relative to the fixed wing portion. The actuation system also includes a linkage assembly coupled between the fixed wing portion and the flaperon. The linkage assembly includes a second actuator operable to move the flaperon along a second degree of freedom to pitch the flaperon between an upward position and a downward position.

Example 2 includes the aircraft of Example 1, wherein the first and second actuators are independently operable.

Example 3 includes the aircraft of Examples 1 or 2, wherein the linkage assembly includes a rocker rotatably coupled to the fixed wing portion. The flaperon is rotatably coupled to the rocker.

Example 4 includes the aircraft of Example 3, wherein the linkage assembly includes a push rod coupled between the first actuator and the rocker such that activation of the first actuator moves the rocker and the flaperon relative to the fixed wing portion, and wherein the second actuator is coupled between the rocker and the flaperon such that activation of the second actuator moves the flaperon relative to the rocker.

Example 5 includes the aircraft of Example 4, wherein the second actuator is a linear actuator.

Example 6 includes the aircraft of Example 5, wherein a first end of the linear actuator is rotatably coupled to the rocker and a second end of the linear actuator is rotatably coupled to the flaperon.

Example 7 includes the aircraft of Examples 3-6, wherein a first end of the rocker is rotatably coupled to the fixed wing portion and a second end of the rocker rotatably coupled to the first actuator, and a flaperon carrier beam of the flaperon is rotatably coupled to the rocker between the first and second ends.

Example 8 includes the aircraft of Example 7, wherein the second actuator is linear actuator including a screw and a nut moveable along the screw, and wherein the second end of the rocker is rotatably coupled to the nut.

Example 9 includes the aircraft of Examples 7 or 8, wherein the rocker has a first portion between the first end and the flaperon and a second portion between the second end and the flaperon, and wherein the first and second portions are angled relative to each other.

Example 10 includes the aircraft of any of Examples 1-9, further including a seal coupled to a bottom panel of the fixed wing portion, the seal to cover a space between the bottom panel and a bottom side of the flaperon when the flaperon is in the stowed position.

Example 11 includes the aircraft of any of Examples 1-10, wherein the wing includes a spoiler forward of the flaperon on a top of the fixed wing portion and a third actuator to rotate the spoiler, wherein the third actuator is to rotate the spoiler downward relative to the fixed wing portion when the flaperon is moved downward relative to the fixed wing portion.

Example 12 includes the aircraft of Example 11, wherein the third actuator is to rotate the spoiler upward relative to the fixed wing portion when the second actuator pitches the flaperon upward relative to the fixed wing portion.

Example 13 is an aircraft comprising a wing including a fixed wing portion, a flaperon, and an actuation system. The actuation system includes a first actuator coupled to the fixed wing portion, a rocker rotatably coupled to the fixed wing portion, the flaperon rotatably coupled to the rocker, a push rod coupled between the first actuator and the rocker such that activation of the first actuator moves the rocker and the flaperon, and a second actuator coupled between the rocker and the flaperon such that activation of the second actuator moves the flaperon relative to the rocker.

Example 14 includes the aircraft of Example 13, wherein the first and second actuators are independently operable.

Example 15 includes the aircraft of Examples 13 or 14, wherein: the rocker is rotatably coupled to the fixed wing portion at a first pivot, the flaperon is rotatably coupled to the rocker at a second pivot, the push rod is rotatably coupled to the rocker at a third pivot, and a first end of the second actuator is rotatably coupled to the rocker at a fourth pivot.

Example 16 includes the aircraft of Example 15, wherein a second end of the second actuator is rotatably coupled to the flaperon at a fifth pivot.

Example 17 includes the aircraft of Example 16, wherein the fifth pivot is aft of the second pivot.

Example 18 is a method comprising activating a first actuator to move a flaperon of an aircraft wing along a first degree of freedom between a stowed position and a deployed position relative to a fixed wing portion of the aircraft wing, and activating a second actuator to move the flaperon along a second degree of freedom to pitch the flaperon between an upward position and a downward position.

Example 19 includes the method of Example 18, wherein the activating the first actuator and the activating of the second actuator occur simultaneously.

Example 20 includes the method of Example 18, wherein the activating of the first actuator and the activating of the second actuator occur at different times.

Although certain example methods, apparatus, systems, and articles of manufacture have been disclosed herein, the scope of coverage of this patent is not limited thereto. On the contrary, this patent covers all methods, apparatus, systems and articles of manufacture fairly falling within the scope of the claims of this patent.

The following claims are hereby incorporated into this Detailed Description by this reference, with each claim standing on its own as a separate embodiment of the present disclosure.

What is claimed is:

1. An aircraft comprising:
   a wing including:
      a fixed wing portion supporting a rib;
      a flaperon; and
      an actuation system including:
         a first actuator coupled to the rib, wherein the first actuator is a rotary actuator to move, at a first rate of movement, the flaperon along a first degree of freedom between a stowed position in which the flaperon is aligned with the fixed wing portion and a deployed position in which the flaperon is moved downward relative to the fixed wing portion; and
         a linkage assembly coupled between the fixed wing portion and the flaperon, the linkage assembly including:
            a rocker coupled to the rib at a first pivot, the rocker coupled to the first actuator at a second pivot, the rocker coupled to the flaperon at a third pivot; and
            a second actuator to move, at a second rate of movement greater than the first rate of movement, the flaperon along a second degree of freedom to pitch the flaperon between an upward position and a downward position, the rocker coupled to the second actuator at a fourth pivot.

2. The aircraft of claim 1, wherein the first and second actuators are independently operable.

3. The aircraft of claim 1, wherein the linkage assembly includes a push rod coupled between the first actuator and the rocker such that activation of the first actuator moves the rocker and the flaperon relative to the fixed wing portion, and wherein the second actuator is coupled between the rocker and the flaperon such that activation of the second actuator moves the flaperon relative to the rocker.

4. The aircraft of claim 1, wherein the second actuator is a linear actuator.

5. The aircraft of claim 4, wherein a first end of the linear actuator is rotatably coupled to the rocker and a second end of the linear actuator is rotatably coupled to the flaperon.

6. The aircraft of claim 1, wherein the first pivot is at a first end of the rocker, the second pivot is a second end of the rocker, and a flaperon carrier beam of the flaperon is rotatably coupled to the rocker at the third pivot, the third pivot between the first and second ends.

7. The aircraft of claim 6, wherein the second actuator is a linear actuator including a screw and a nut moveable along the screw, and wherein the second end of the rocker is rotatably coupled to the nut.

8. The aircraft of claim 6, wherein the rocker has a first portion between the first end and the flaperon and a second portion between the second end and the flaperon, and wherein the first and second portions are angled relative to each other.

9. The aircraft of claim 1, further including a seal coupled to a bottom panel of the fixed wing portion, the seal to cover a space between the bottom panel and a bottom side of the flaperon when the flaperon is in the stowed position.

10. The aircraft of claim 1, wherein the wing includes:
    a spoiler forward of the flaperon on a top of the fixed wing portion; and
    a third actuator to rotate the spoiler, wherein the third actuator is to rotate the spoiler downward relative to the fixed wing portion when the flaperon is moved downward relative to the fixed wing portion.

11. The aircraft of claim 10, wherein the third actuator is to rotate the spoiler upward relative to the fixed wing portion when the second actuator pitches the flaperon upward relative to the fixed wing portion.

12. An aircraft comprising:
    a wing including:
       a fixed wing portion including a rib;
       a flaperon; and
       an actuation system including:
          a first actuator coupled to the rib, wherein the first actuator is a rotary actuator;
          a rocker coupled to the fixed wing portion at a first pivot, the rocker coupled to the first actuator at a second pivot, and the rocker coupled to the flaperon at a third pivot;
          a push rod coupled between the first actuator and the rocker such that activation of the first actuator moves the rocker and the flaperon at a first rate of movement; and
          a second actuator coupled between a fourth pivot of the rocker and the flaperon such that activation of the second actuator moves the flaperon relative to the rocker at a second rate of movement greater than the first rate of movement.

13. The aircraft of claim 12, wherein the first and second actuators are independently operable.

14. The aircraft of claim 12, wherein a second end of the second actuator is rotatably coupled to the flaperon at a fifth pivot.

15. The aircraft of claim 14, wherein the fifth pivot is aft of the third pivot.

16. A method comprising:
    activating a first actuator to move a flaperon of an aircraft wing along a first degree of freedom, at a first rate of movement, between a stowed position and a deployed position relative to a fixed wing portion of the aircraft wing, wherein the first actuator is a rotary actuator coupled to a rocker and a rib of the fixed wing portion; and
    activating a second actuator to move the flaperon along a second degree of freedom, at a second rate of movement greater than the first rate of movement, to pitch the flaperon between an upward position and a downward position, the rocker coupled to the rib at a first pivot, the rocker coupled to the first actuator at a second pivot, the rocker coupled to the flaperon at a third pivot, and the rocker coupled to the second actuator at a fourth pivot.

17. The method of claim 16, wherein the activating the first actuator and the activating of the second actuator occur simultaneously.

18. The method of claim 16, wherein the activating of the first actuator and the activating of the second actuator occur at different times.

19. The aircraft of claim 1, wherein the first actuator is a rotary actuator.

* * * * *